(12) United States Patent
Swengler

(10) Patent No.: US 9,646,013 B2
(45) Date of Patent: May 9, 2017

(54) SYSTEM AND METHOD FOR FILE MANAGEMENT

(75) Inventor: Paul Stuart Swengler, Lutz, FL (US)

(73) Assignee: DOCBERT LLC, Brandon, FL (US)

( * ) Notice: Subject to any disclaimer, the term of this patent is extended or adjusted under 35 U.S.C. 154(b) by 415 days.

(21) Appl. No.: 13/471,440

(22) Filed: May 14, 2012

(65) Prior Publication Data

US 2012/0226662 A1    Sep. 6, 2012

Related U.S. Application Data

(63) Continuation-in-part of application No. 13/028,773, filed on Feb. 16, 2011, now Pat. No. 8,180,814.

(51) Int. Cl.
*G06F 7/00* (2006.01)
*G06F 17/00* (2006.01)
*G06F 17/30* (2006.01)

(52) U.S. Cl.
CPC .. *G06F 17/30091* (2013.01); *G06F 17/30126* (2013.01)

(58) Field of Classification Search
CPC ................................................ G06F 17/30067
USPC ........................................................ 707/634
See application file for complete search history.

(56) References Cited

U.S. PATENT DOCUMENTS

| | | |
|---|---|---|
| 5,047,918 A | 9/1991 | Schwartz et al. |
| 5,694,594 A | 12/1997 | Chang |
| 5,751,287 A | 5/1998 | Hahn et al. |
| 5,812,995 A | 9/1998 | Sasaki et al. |
| 5,899,995 A | 5/1999 | Millier et al. |
| 5,969,720 A | 10/1999 | Lisle et al. |
| 6,009,442 A | 12/1999 | Chen et al. |
| 6,307,547 B1 | 10/2001 | Bolnick |
| 6,477,528 B1 | 11/2002 | Takayama |
| 6,582,474 B2 | 6/2003 | LaMarca et al. |
| 6,760,721 B1 | 7/2004 | Chasen et al. |
| 6,760,731 B2 * | 7/2004 | Huff |
| 6,820,094 B1 | 11/2004 | Ferguson et al. |
| 7,051,277 B2 | 5/2006 | Kephart et al. |
| 7,069,505 B2 | 6/2006 | Tamano |
| 7,228,299 B1 | 6/2007 | Harmer et al. |
| 7,483,895 B2 | 1/2009 | Hysom et al. |
| 7,499,925 B2 | 3/2009 | Moore et al. |
| 7,506,010 B2 | 3/2009 | Kulkarni et al. |
| 7,533,116 B2 | 5/2009 | Lacy |
| 7,590,633 B1 * | 9/2009 | Manley et al. |

(Continued)

FOREIGN PATENT DOCUMENTS

WO    01/97070    12/2001

OTHER PUBLICATIONS

HP, Open VMS documentation, Open VMS System Manager's Manual, Jun. 15, 2002, pp. 1-8.

(Continued)

*Primary Examiner* — Alexey Shmatov
*Assistant Examiner* — Muluemebet Gurmu
(74) *Attorney, Agent, or Firm* — Law Office of Steven R. Olsen, PLLC; Steven R. Olsen

(57) ABSTRACT

Embodiments of the invention provide, among other things, an improved system and method for building logical associations (links) between files and for assigning attributes to the files and/or links. In embodiments of the invention, such attribute data is indexed in a data store according to Universally Unique Identifiers (UUIDs) in each file header.

15 Claims, 27 Drawing Sheets

(56) References Cited

U.S. PATENT DOCUMENTS

| | | | |
|---|---|---|---|
| 8,065,266 B2* | 11/2011 | Hoang et al. | 707/608 |
| 8,214,404 B2* | 7/2012 | Kazar | 707/797 |
| 8,392,460 B2* | 3/2013 | Hoang et al. | 707/791 |
| 8,515,911 B1* | 8/2013 | Zhou et al. | 707/638 |
| 2004/0133588 A1 | 7/2004 | Kiessig et al. | |
| 2004/0153468 A1 | 8/2004 | Paila et al. | |
| 2005/0015816 A1 | 1/2005 | Christofalo et al. | |
| 2005/0027797 A1* | 2/2005 | San Andres et al. | 709/203 |
| 2006/0179153 A1* | 8/2006 | Lee | H04L 67/32 709/231 |
| 2007/0067427 A1* | 3/2007 | Bugir et al. | 709/223 |
| 2007/0168325 A1 | 7/2007 | Bourne et al. | |
| 2007/0204215 A1* | 8/2007 | Mueller | G06F 17/50 715/205 |
| 2007/0271317 A1* | 11/2007 | Carmel | 707/204 |
| 2008/0040388 A1 | 2/2008 | Petri et al. | |
| 2008/0059495 A1 | 3/2008 | Kiessig et al. | |
| 2008/0059595 A1 | 3/2008 | Kiss et al. | |
| 2008/0091745 A1 | 4/2008 | Malik | |
| 2010/0021001 A1 | 1/2010 | Honsinger et al. | |
| 2010/0316292 A1 | 12/2010 | O'Hara et al. | |

OTHER PUBLICATIONS

Alexander Ames, et al., Richer File System Metadata Using Links and Attributes, Proceedings of the 22nd IEEE/13th NASA Goddard Conference on Mass Storage Systems and Technologies (MSST 2005), Monterey, CA, Apr. 2005.

Mealling, et al., RFC 4122: A Universally Unique IDentifier (UUID) URN Namespace (The Internet Society, Jul. 2005).

* cited by examiner

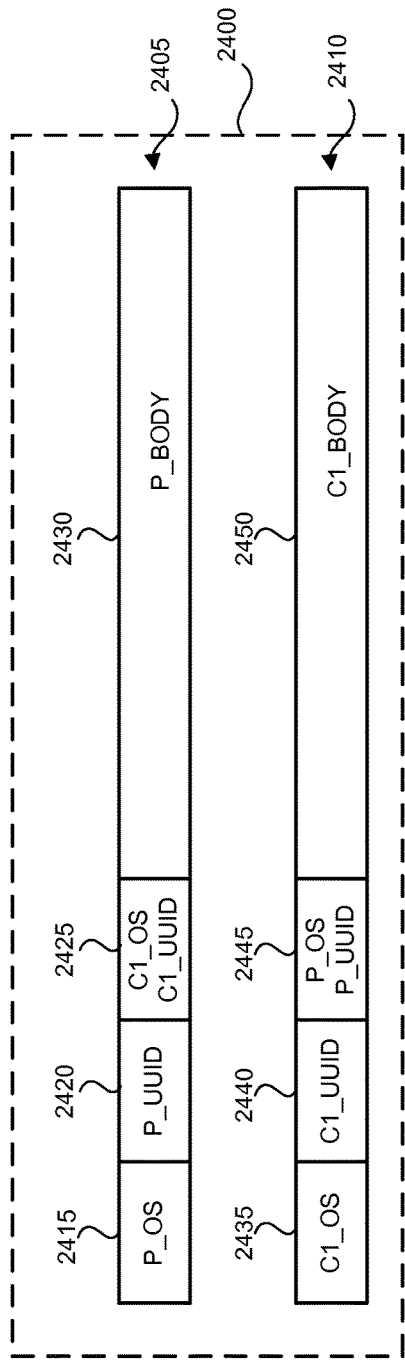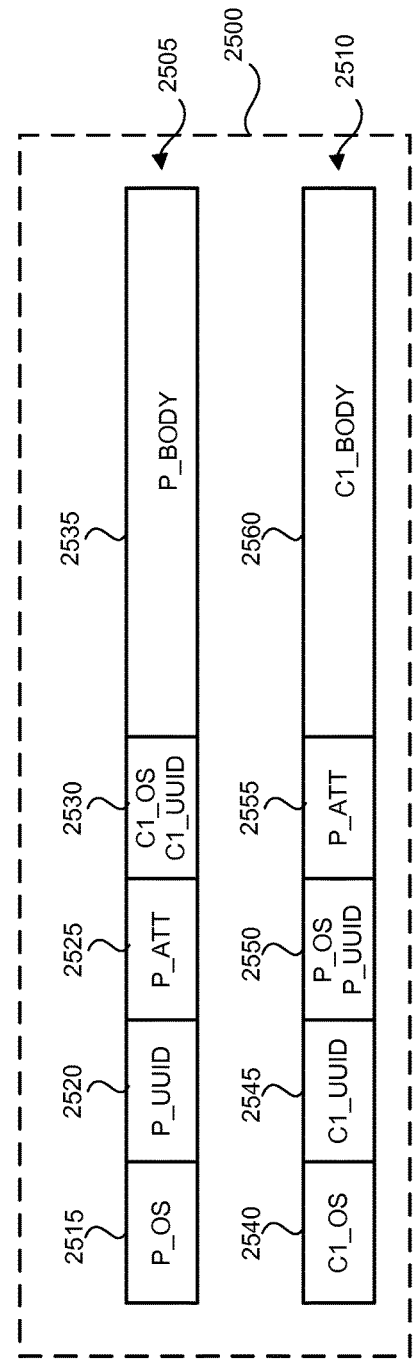

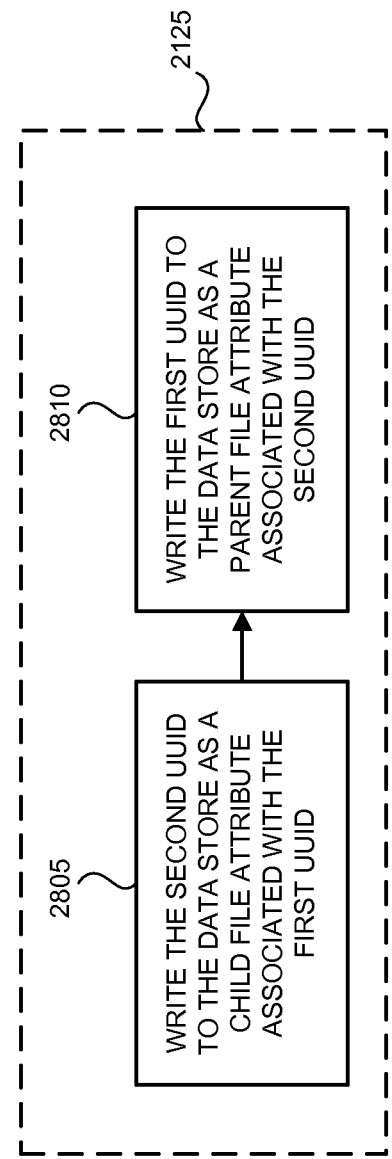

SYSTEM AND METHOD FOR FILE MANAGEMENT

CROSS-REFERENCE TO RELATED APPLICATIONS

This is a continuation-in-part of U.S. application Ser. No. 13/028,773, filed on Feb. 16, 2011, now U.S. Pat. No. 8,180,814.

FIELD OF INVENTION

The invention relates generally to the field of electronic data storage. In particular, but not by way of limitation, the invention relates to a system and method for managing electronic files and associated data.

BACKGROUND

Various file management systems and methods are known. A typical File Management System (FMS) provides a logical user interface that facilitates the organization of files and provides an interface to one or more physical storage devices.

Conventional systems and methods for managing electronic files have various disadvantages, however. For instance, a typical FMS uses nested folders or a similar hierarchical format to facilitate logical organization. Each stored file is associated with a single logical path. If a user wishes to associate a file with multiple logical groupings, it may be necessary to create a corresponding multiple number of copies of the file. One shortcoming of such systems is that they do not provide an integrated view for each of the file's logical associations with other stored files. Another disadvantage of such systems is that creating a new physical copy of a file for each logical path is not an efficient use of physical storage.

Therefore, a need exists for an improved system and method for building, viewing, and/or managing multiple logical associations for a stored electronic file.

SUMMARY OF THE INVENTION

Embodiments of the invention seek to overcome one or more of the limitations described above. Embodiments of the invention provide, among other things, an improved system and method for building logical associations (links) between files and for assigning attributes to the files and/or links. Such attributes may be or include lineage data. In embodiments of the invention, such attribute data is indexed in a data store according to Universally Unique Identifiers (UUIDs) in each file header. In the alternative, or in combination, such attribute data may be stored in file headers.

Embodiments of the invention provide a specially-configured computer that includes a file management system. In embodiments of the invention, the file management system is configured to perform a file copying process, an original file being a parent, a copy of the original file being a child. In embodiments of the invention, the file copying process includes the steps of: reading a first Universally Unique Identifier (UUID) in a header of the parent; generating a second UUID; writing the second UUID to a header of the child; and forming at least one lineage record associating the first UUID and the second UUID, the at least one lineage record thus associating the parent and the child without reference to a filename of the parent or a filename of the child.

BRIEF DESCRIPTION OF THE DRAWINGS

Embodiments of the invention are described with reference to the following drawings, wherein:

FIG. 24 is an illustration of a structure for a parent file and a child file, according to an embodiment of the invention;

FIG. 25 is an illustration of a structure for a parent file and a child file, according to an embodiment of the invention;

FIG. 28 is a flow diagram of process for creating a lineage record, according to an embodiment of the invention.

DETAILED DESCRIPTION

Embodiments of the invention will now be described more fully with reference to FIGS. 1 through 28. The invention may, however, be embodied in many different forms and should not be construed as limited to the embodiments set forth herein. Rather, these embodiments are provided so this disclosure will enable a person having ordinary skill in the art to practice the claimed invention.

In embodiments of the invention, a user can assign attributes to a file. The user can also build links (logical associations between two files or references from one file to another). Such file and link attribute data can be used to enhance file searching, export controls, and/or other file management tasks.

Figure 1:
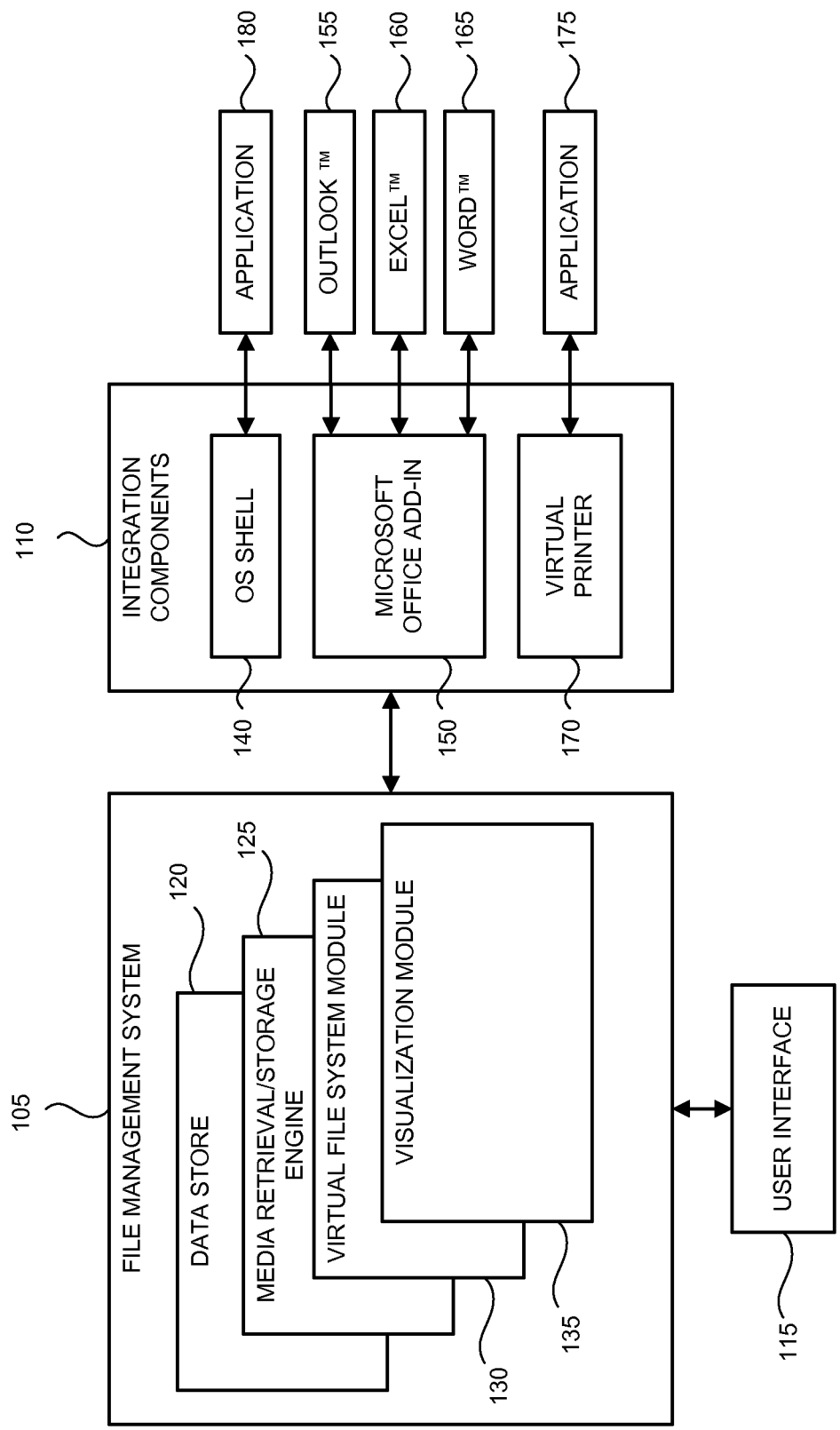
FIG. 1 is a functional block diagram of a computer system, according to an embodiment of the invention.

FIG. 1 is a functional block diagram of a computer system, according to an embodiment of the invention. As illustrated in FIG. 1, a file management system (FMS) 105 is coupled to integration components 110 and a user interface 115. The FMS 105 may include a data store 120, media retrieval/storage engine 125, a virtual file system module 130, and/or a visualization module 135. The integration components 110 may include an OS (Operating System) shell 140, a Microsoft® Office add-in 150, and/or a virtual printer 170. In the illustrated embodiment, an application 180 uses the OS shell 140 to interface to the FMS 105. Office Outlook application 155, Office Excel application 160, and Office Word application 165 are each coupled to the Microsoft® Office add-in 150. Application 175 is coupled to the FMS 105 via the virtual printer 170. Intuit® QuickBooks® is an example of a potential application 175 or 180 that could be coupled to the FMS 105.

In operation, logical links between files and/or other attributes may be associated with electronic files using the virtual file system module 130 and/or visualization module 135. Such links and/or other attributes may be written to or retrieved from the data store 120 using the media retrieval/storage engine 125. Applications 155, 160, 165, 175 and/or 180 may access the FMS 105 via integration components 110.

The FMS 105 is configured to co-operate with the user interface 115. One embodiment of the user interface 115 is described below with reference to FIGS. 4-10 and 15. The media retrieval/storage engine 125 and data store 120 may be configured to operate as described with reference to FIGS. 11 and 12. The FMS 105 may also be configured to execute the link building process described with reference to FIGS. 13 and 14, the key determining process described with reference to FIG. 16, and the export process illustrated in FIGS. 18 and 19.

Variations to the configuration illustrated in FIG. 1 are possible. For instance, in alternative embodiments, links and other attributes stored in the data store 120 could be exploited without the virtual file system module 130 and/or the visualization module 135, according to design choice. Moreover, any one or more of the illustrated integrated components 110 could be used. In other embodiments, alternative integration methods could be used.

Figure 2:
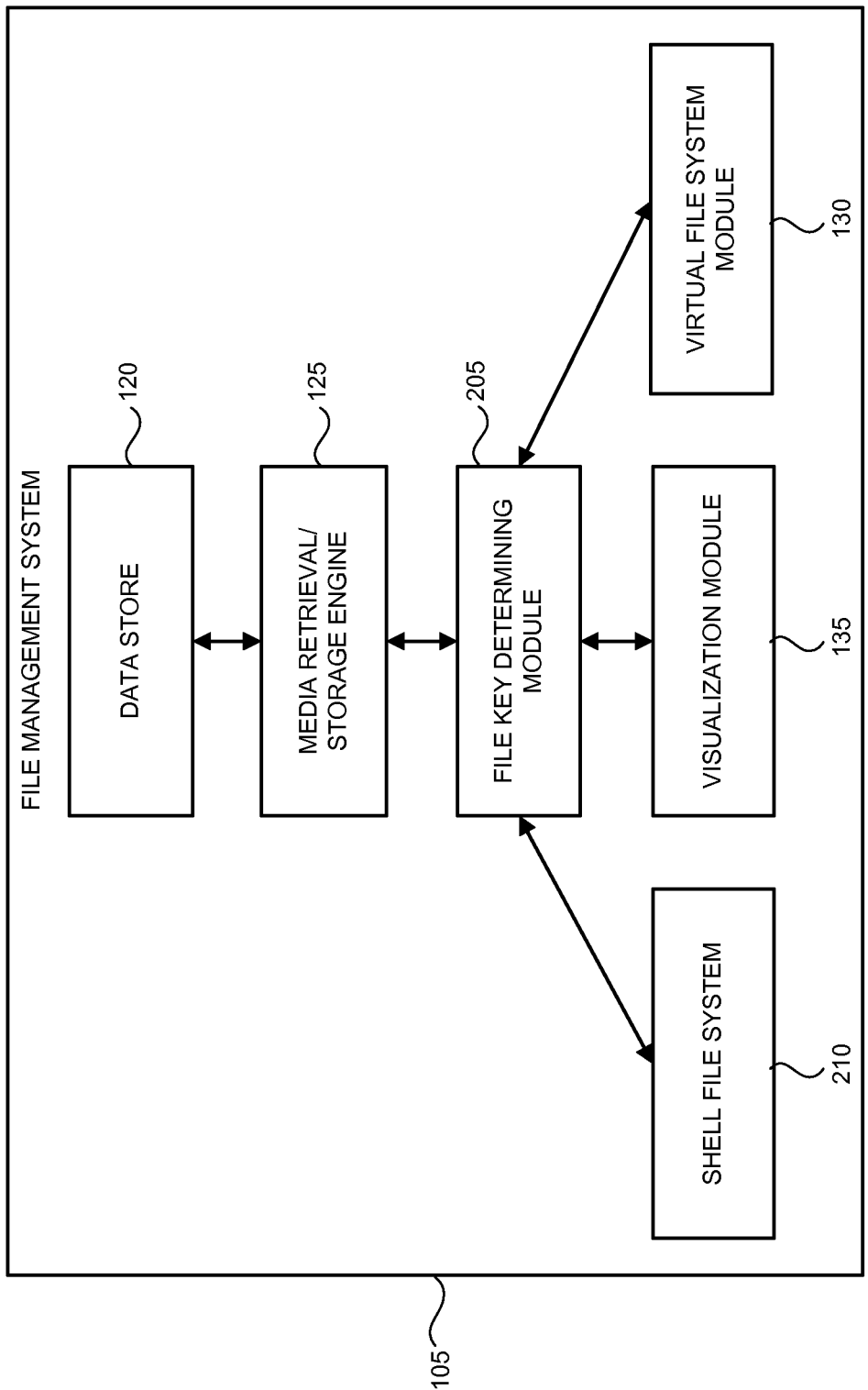
FIG. 2 is a functional block diagram of the file management system in FIG. 1, according to an embodiment of the invention.

FIG. 2 is a functional block diagram of a file management system, according to an embodiment of the invention. As illustrated in FIG. 2, the FMS 105 may include a data store 120 coupled to a media retrieval/storage engine 125. The data store 120 and/or media retrieval/storage engine 125 may be or include, for example, MYSQL, Oracle, SQLITE, Microsoft Access™ or other software. In the illustrated embodiment, the media retrieval/storage engine 125 is coupled to a file key determining module 205. The virtual file system module 130, a visualization module 135, and/or a shell (native) file system 210 may each be coupled to the file key determining module 205.

In operation, the media retrieval/storage engine 125 manages the interface to the data store 120. The link data and other file attributes are associated in the data store 120 using a file key in the form of a Universally Unique Identifier (UUID) rather than a file name. This may be advantageous, for instance, where a user changes file names or creates multiple virtual file names. The file key determining module 205 is thus configured to determine a file key before link data or file attributes are stored in, or retrieved from, the data store 120. The determining could include reading a file key or assigning a file key as described below with reference to FIGS. 16 and 17.

In embodiments of the invention, links can be built and viewed using the visualization module 135 and/or the virtual file system(s) 130, for instance as will be described with reference to FIGS. 4, 13 and 14 below.

Figure 3:
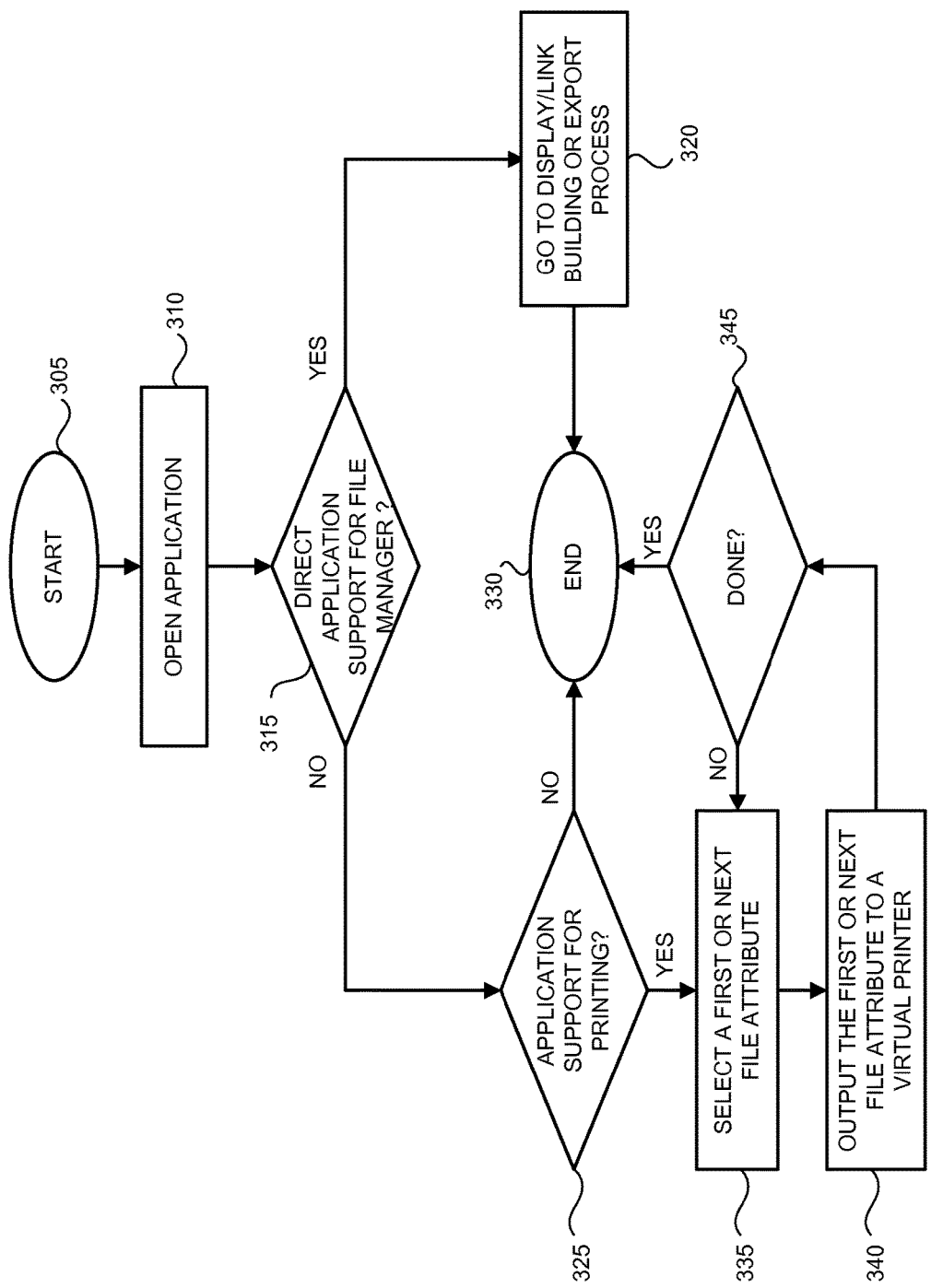
FIG. 3 is a flow diagram of an integration process, according to an embodiment of the invention.

FIG. 3 is a flow diagram of an integration process, according to an embodiment of the invention. In the embodiment illustrated in FIG. 3, an integration process begins in step 305, and then proceeds to open an application program in step 310. Next, in conditional step 315, the process determines whether there is direct application support for the FMS 105. Where there is direct application support for the FMS 105, the process advances to step 320 to execute a display/link building or export process before terminating in step 330. Otherwise, where there is not direct application support for FMS 105, the process advances to conditional step 325. In step 325, the process determines whether there is application support for printing. Where there is not such support, the process terminates in step 330. Otherwise, the process proceeds to step 335 to select a first or next file attribute data for printing. Then, in step 340, the process outputs the first or next file attribute data to a virtual printer. As used herein, a virtual printer is software whose user interface (UI) and/or application program interface (API) mimics a printer driver, but is configured to output data to a file rather than printer hardware. Step 340 may include, for instance, selecting the FMS 105 from a printer settings dialog box. Next, in conditional step 345, the process determines whether printing to the virtual printer is completed. Where it is not, the process returns to step 335; otherwise the process terminates in step 330. The illustrated process thus uses direct application support where it exists. Otherwise, the process provides integration via a virtual printer 170.

Figure 4:
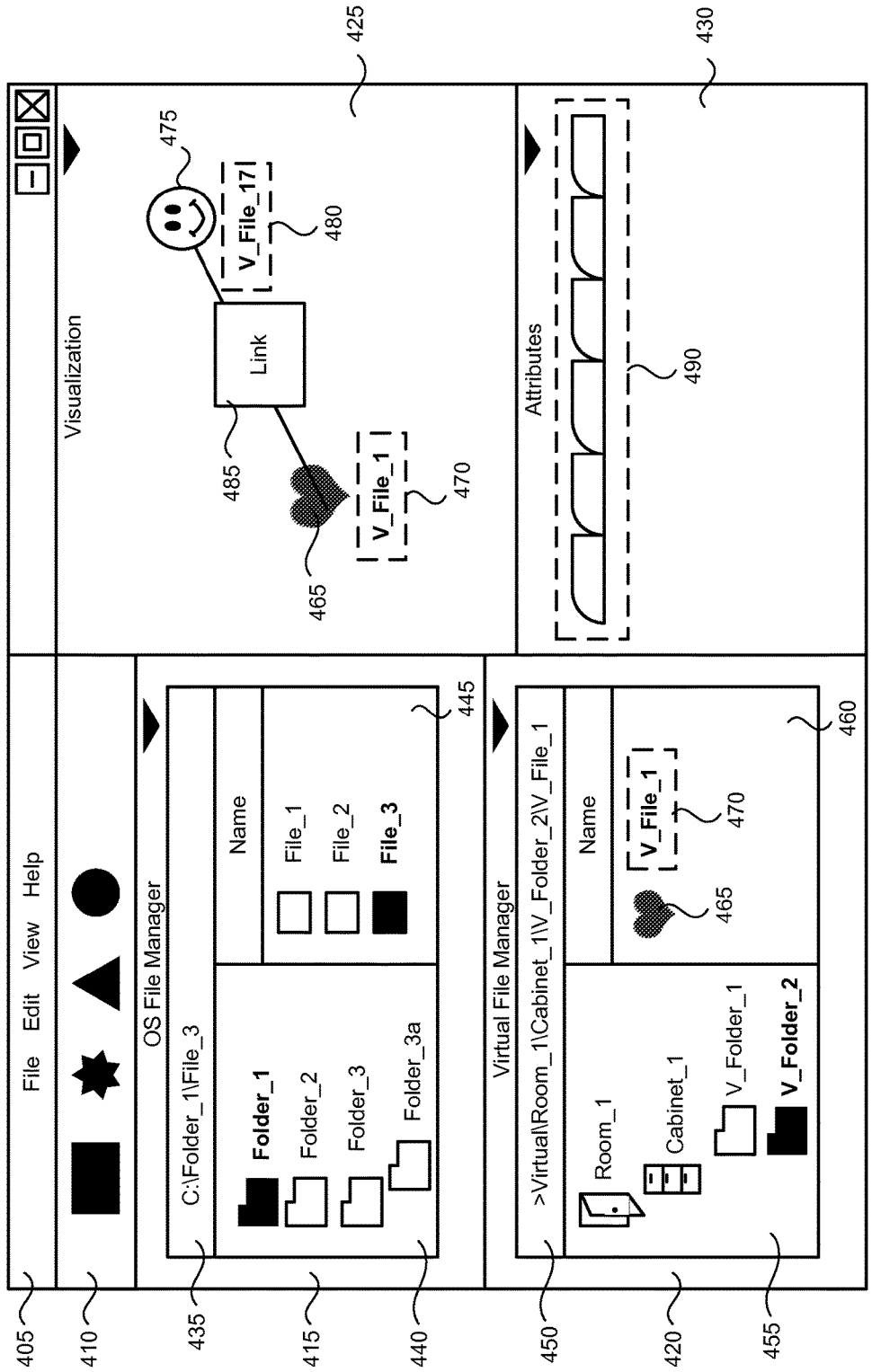
FIG. 4 is an illustration of a Graphical User Interface (GUI), according to an embodiment of the invention.

FIG. 4 is an illustration of a Graphical User Interface (GUI), according to an embodiment of the invention. The GUI in FIG. 4 is a representative user interface 115. The illustrated GUI includes a menu bar 405, quick access icons 410, operating system (OS) file manager window 415, virtual file manager window 420, visualization window 425, and attributes window 430. The OS file manager window 415 includes a system path area 435, a system folder area 440 and a system file area 445. The OS file manager window 415 and its components relate to the native operating system file structure.

The virtual file manager window 420 includes a virtual path area 450, a virtual folder area 455, and a virtual file area 460. In the illustrated embodiment, the virtual folder area 455 is organized in a room/cabinet/folder hierarchy. Each file in the virtual file area 460 includes a virtual file name 470 and may include a virtual file icon 465.

In operation, a user may use the GUI illustrated in FIG. 4 to build a virtual file structure in the virtual folder area 455 (for example, a room/cabinet/folder hierarchy, as shown). The user may then associate one of more system files with the virtual file structure, for instance by dragging and dropping a file from the system file area 445 to the virtual file area 460. Advantageously, a user may assign attributes to files that are represented in the virtual file manager window 420. For instance, a user may assign keywords, descriptions, labels, tags, and/or other file attributes to each virtual file. Examples of such file attributes will be provided in more detail below. A user may assign such file attributes, for example, by using a menu-based GUI feature and/or by completing a dialog box. The system may also assign or facilitate the assignment of file attributes such as author, editor, and/or dates of creation or edit. In embodiments of the invention, a user may also assign attributes to a group of files, for instance by first selecting a room, cabinet or folder associated with the group of files in the virtual folder area 455. In embodiments of the invention, the virtual file system module 130 supports multiple alternative virtual file systems that could be rendered in the virtual file manager window 420. In embodiments of the invention, such multiple alternative virtual file systems may be viewed concurrently (for example via multiple virtual file manager windows 420).

The visualization window 425 includes a graphical illustration of a first file that is logically associated with a second file via link 485. The first file is represented by a virtual file name 470 and virtual file icon 465. The second file is represented by a virtual file name 480 and virtual file icon 475. The GUI in FIG. 4 may be configured such that a user can drag and drop files from the virtual file area 460 to the visualization window 425. Thereafter, a user can form links between virtual files in the visualization window 425. The GUI may also permit a user to drag and drop a file from the system file area 445 to the visualization window 425. In this instance, the GUI may open a dialog box prompting the user to associate the selected file with a virtual file structure and/or to assign certain other file attributes. A process flow for such a configuration is described below with reference to FIGS. 13 and 14.

The visualization window 425 may also be configured so that a user can assign attributes to the link 485. For instance, a user may assign keywords, descriptions, labels, tags, and/or other attributes to each defined link. Examples of such link attributes will be provided in more detail below. A user may assign such link attributes, for example, by using a menu-based GUI and/or by completing a dialog box. The system may also assign or facilitate the assignment of link attributes such as author, editor, and/or dates of creation or edit. The types of link attributes need not be identical to the types of file attributes.

The attribute window 430 is configured to display attributes associated with a selected file or link. For instance, a user may select a file in the virtual file area 460 or in the visualization window 425. In this instance, the attributes window 430 will display attributes of the selected file. Alternatively, a user may select a link, for example in the visualization window 425. In this latter case, the attributes window 430 will display attributes associated with the selected link. The attributes window 430 includes tabs 490 for navigating between various views within the attributes window 430.

In embodiments of the invention, the virtual file system module 130 is interfaced to the virtual file manager window 420. Likewise, the visualization module 135 may be functionally connected to visualization window 425. The data store 120 may contain virtual file name, path and icon data displayed in the virtual file manager window 420 and visualization window 425, link name and logic displayed in the visualization window 425, and/or file and link attribute data that is displayed in the attributes window 430.

Figure 5:
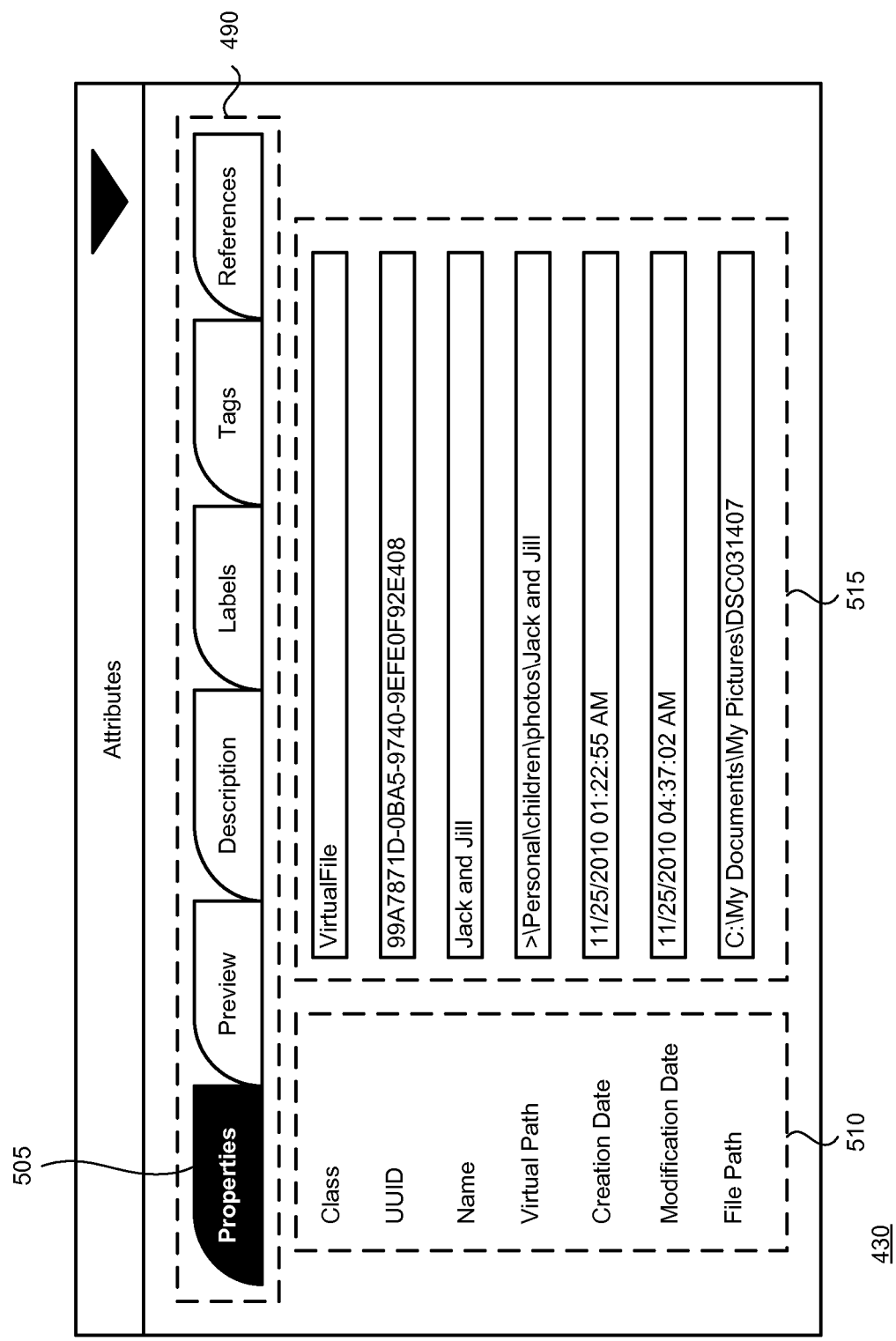
FIGS. 5-10 are illustrations of a portion of the GUI in FIG. 4, according to an embodiment of the invention.

FIGS. 5-10 are illustrations of a portion of the GUI in FIG. 4, according to an embodiment of the invention. More specifically, FIGS. 5-10 present different exemplary views of the attributes window 430. FIG. 5 shows that, in response to properties tab 505 selections, the attributes window 430 displays properties 510 and associated values 515 associated with a selected file or link. In embodiments of the invention, the particular display properties 510 may vary according to whether a file or link is selected. In embodiments of the invention, a user may also use the attributes window 430 to assign attributes to a selected file, group of files, or link.

Figure 6:
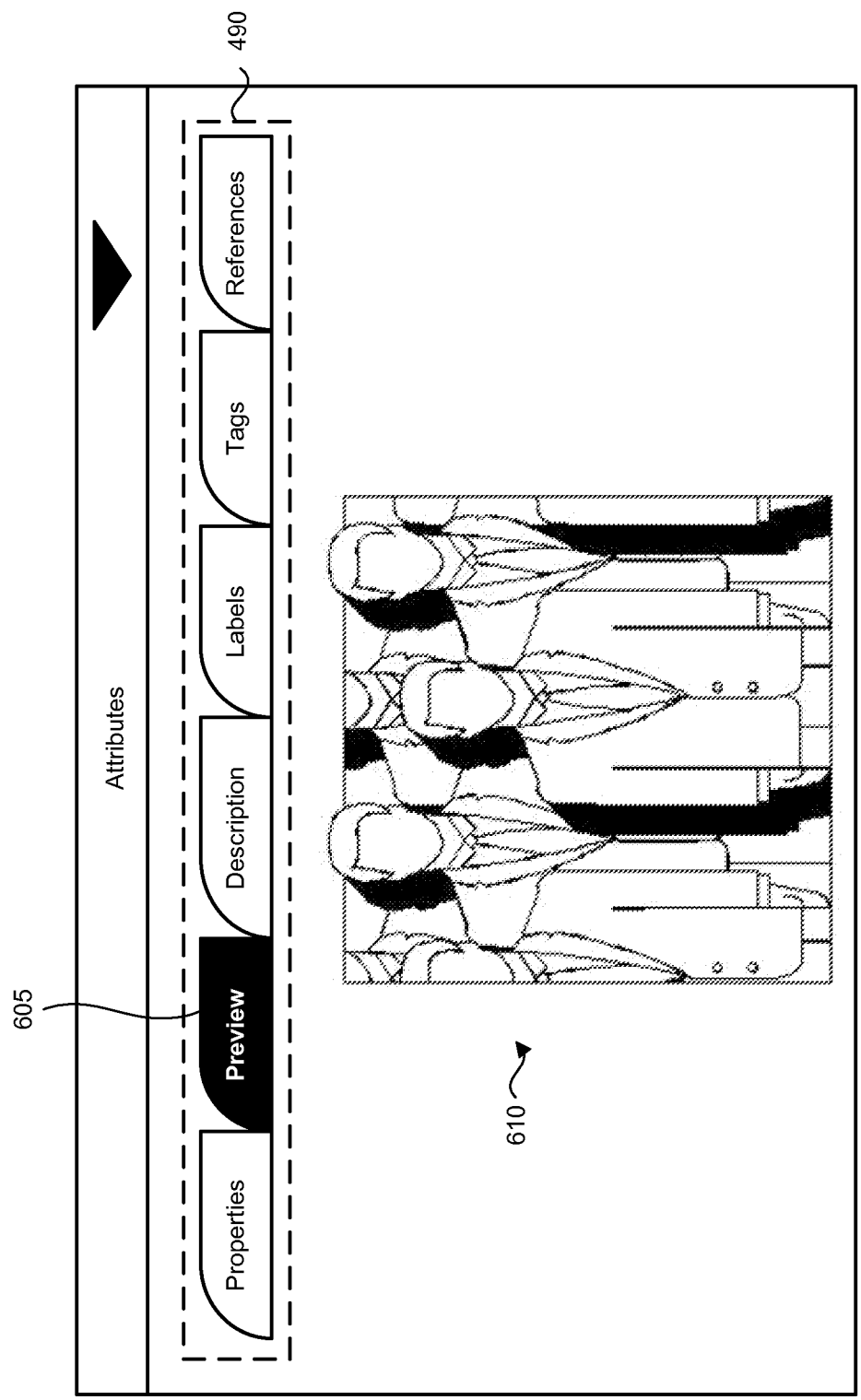

FIG. 6 illustrates that, in response to a preview tab 605 selection, the attributes window 430 displays a preview image 610 associated with the selected virtual file in the virtual file area 460. The preview image 610 could be, for instance, graphics or text. Preferably, the operation of the preview feature is independent of file type. Preview tab 605 may be completely omitted (not displayed) or non-functional where a user has selected a link rather than a file.

Figure 7:
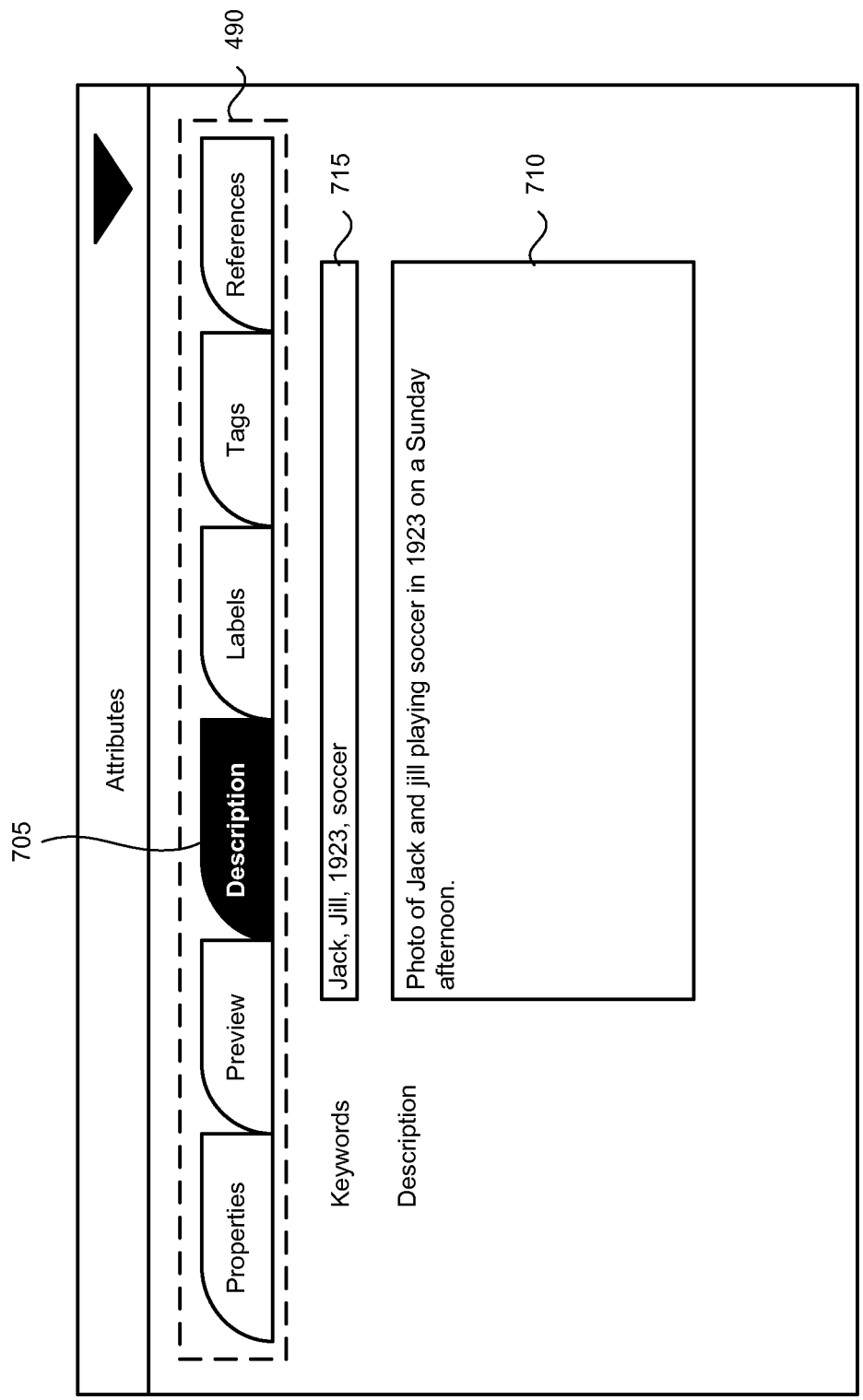

FIG. 7 demonstrates that, in response to a description tab 705 selections, the attributes window 430 may display keywords 715 and/or a textual description 710 associated with the selected file or link. Preferably, attributes associated with the description tab 705 are free-form keywords, key phrases, or descriptions of file content or link logic as illustrated by the keywords 715 and/or a textual description 710 examples.

Figure 8:
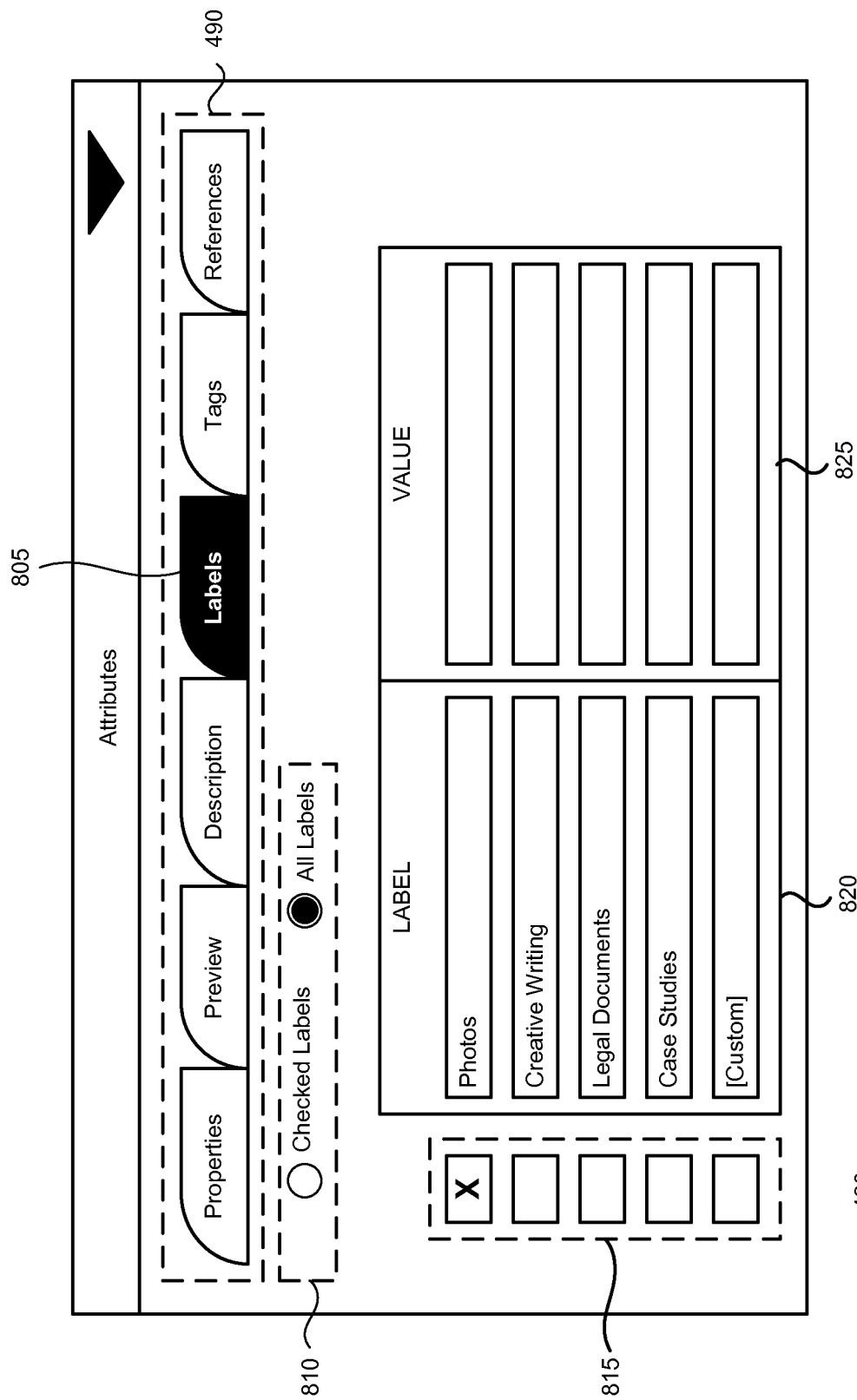

FIG. 8 shows that, in response to a labels tab 805 selection, the attributes window 430 displays checkbox tools 810 and 815, predefined and/or custom labels 820, and corresponding values 825 associated with the selected file or link. Attributes associated with the labels tab 805 preferably represent subject matter classifications. Such classifications may be pre-determined (for instance by an administrator or supervisor), or may be user-defined as indicated by the representative labels 820. The values 825 may also be user-defined and/or incident-based, and may be used on an optional basis.

Figure 9:
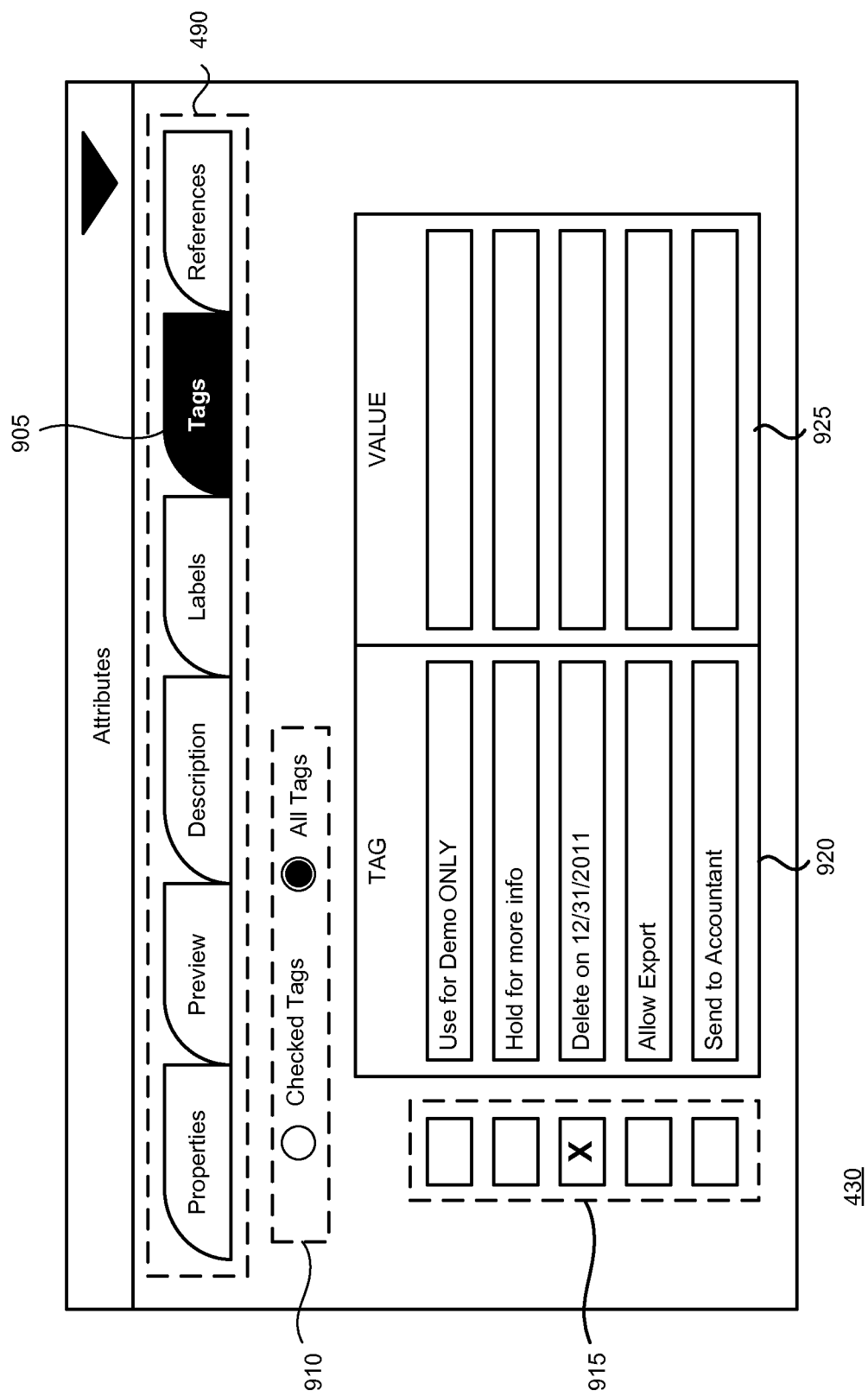

FIG. 9 illustrates that, in response to a tags tab 905 selections, the attributes window 430 displays checkbox tools 910 and 915, predefined and/or custom tags 920 and corresponding values 925 associated with the selected file or link. Attributes associated with the tags tab 905 preferably relate to planned actions or use restrictions, as illustrated by exemplary tags 920. The export tag will be discussed below with reference to FIGS. 18 and 19.

Figure 10:
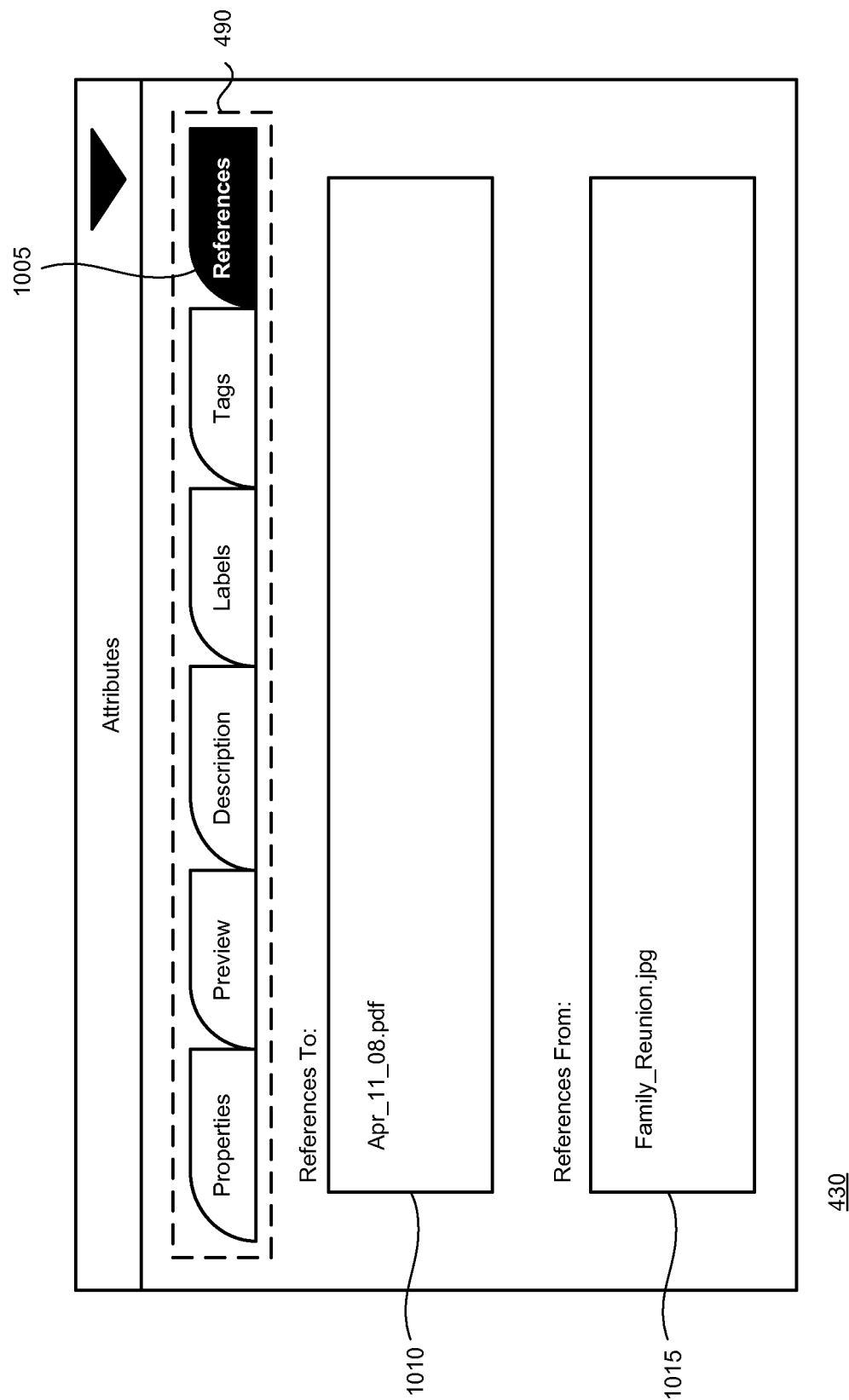

FIG. 10 demonstrates that, in response to references tab 1005 selection, the attributes window 430 may display reference attributes. As used herein, a reference is a file that is linked or associated with another file.

Where a user has selected a link prior to selecting references tab 1005, the attributes window will display two file names representing the corresponding two linked files. In embodiments where links have been assigned directionality, one of the two files will be designated a "from" file and the other will be a "to" reference. This is illustrated in FIG. 10, since the display includes a "from" filename 1015 and a "to" filename 1010. In this example, a user defined the selected link from "Family_Reunion.jpg" to "Apr_11_08.pdf." On the other hand, where a user has selected a file prior to selecting the references tab 1005, the attributes window 430 may display no references (for instance where no links have been defined that include the selected file). Alternatively, the attributes window could display one or more references. In embodiments that include link directionality, the attributes window 430 may or may not display one or more "from" references. In addition, the attributes window may or may not display one or more "to" references.

Other variations could exist in the operation of the references tab 1005. For instance, in an alternative embodiment of the invention, the attributes display could show not only one or more references, but also one or more file attributes of each displayed reference.

The attributes assigned to files and links, examples of which are illustrated in FIGS. 5-10 and discussed above, may be useful in locating, sorting, organizing, exporting and/or otherwise managing a particular file or group of files.

Figure 11:
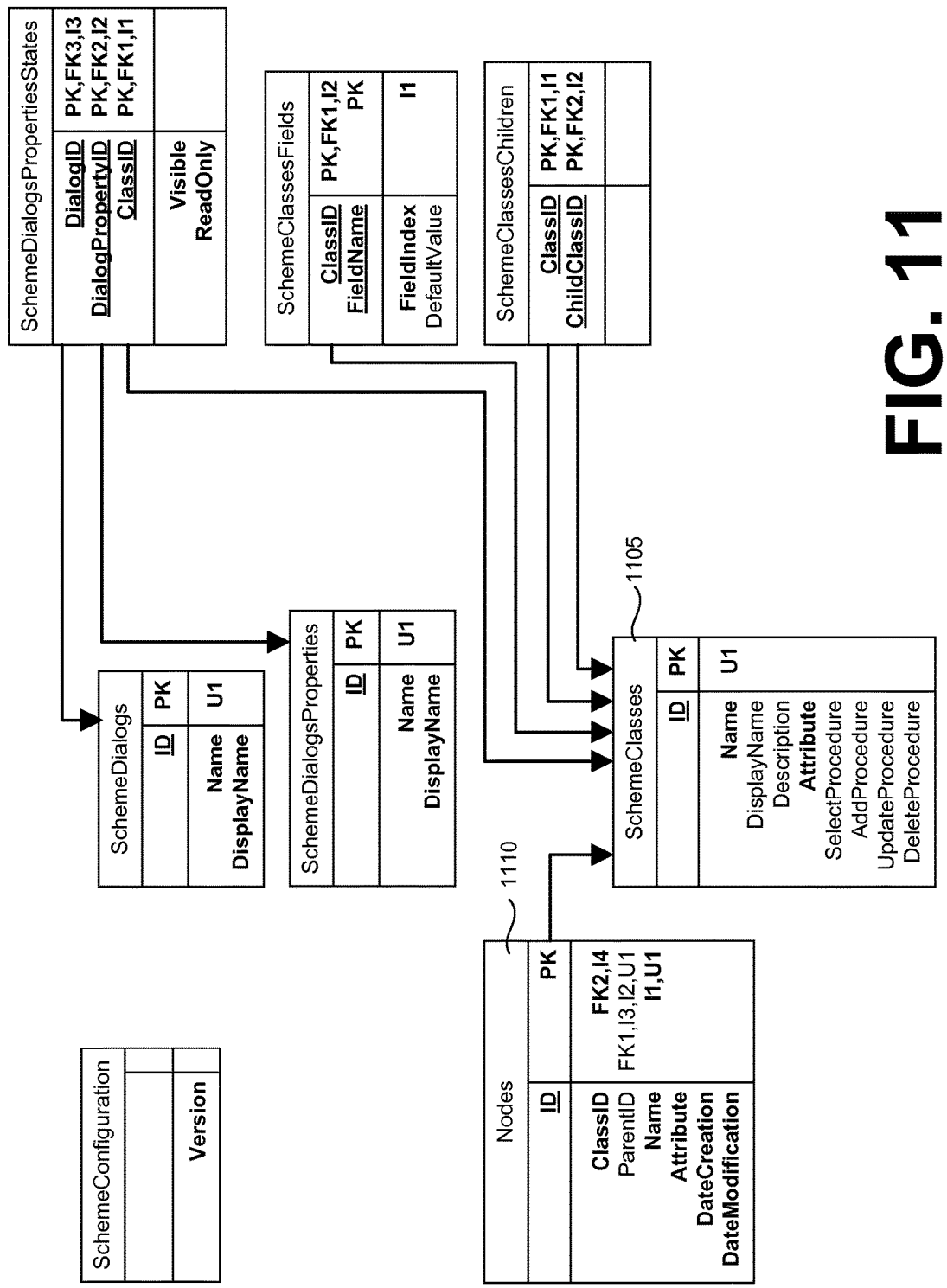
FIGS. 11 and 12 are an illustration of a database structure according to an embodiment of the invention.
Figure 12:
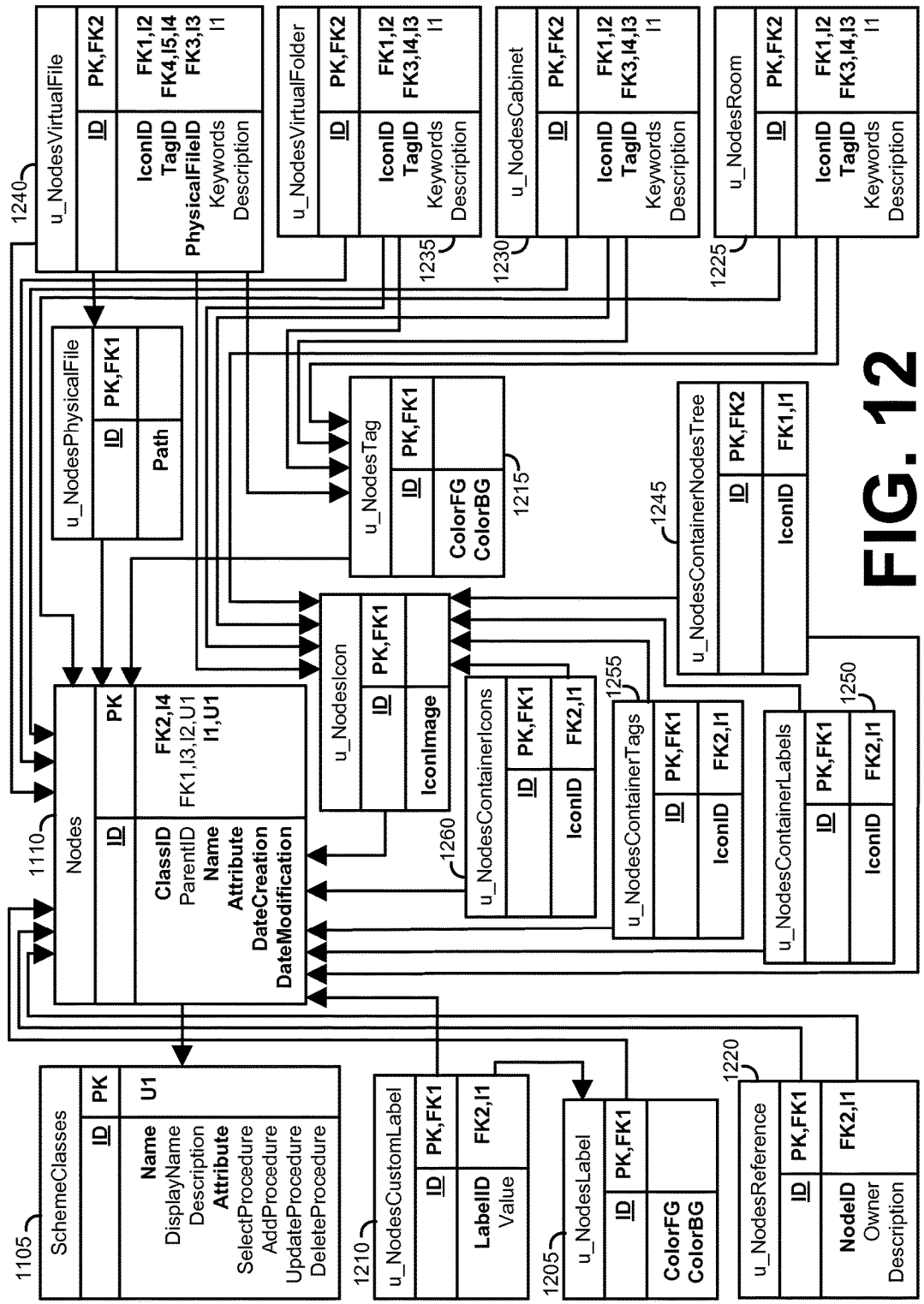

FIGS. 11 and 12 are an illustration of a database structure for the data store 120, according to an embodiment of the invention. SchemeClasses 1105 represents a relational model scheme for all files. Nodes 1110 represents the relational model scheme for each virtual file that may be defined by a user. Accordingly, the Nodes 1110 scheme is further defined by its relation to various classes. For example, the u_NodesRoom 1225, u_NodesCabinet 1230, and u_NodesVirtualFolder 1235 may each represent an organizational class of the virtual file structure illustrated in virtual folder area 455 of FIG. 4. The u_NodesVirtualFile 1240 may represent the class of user-defined virtual files illustrated in Virtual file area 460 of FIG. 4. u_NodesLabel 1205 and u_NodesCustomLabel 120 may represent classes of user-assigned label attributes described above with reference to FIG. 8. u_NodesTag 1215 may represent the class of user-assigned tag attributes discussed above with reference to FIG. 9. u_NodesReference may represent the class of user-assigned reference attributes discussed above with reference to FIG. 10. Containers 1245, 1250, 1255 and 1260 hold predefined tree elements, labels, tags and icons, respectively that a user may select when assigning attributes. In embodiments of the invention, the primary key PK used in the Nodes 1110 scheme is a UUID (also referred to herein as a key).

Figure 13:
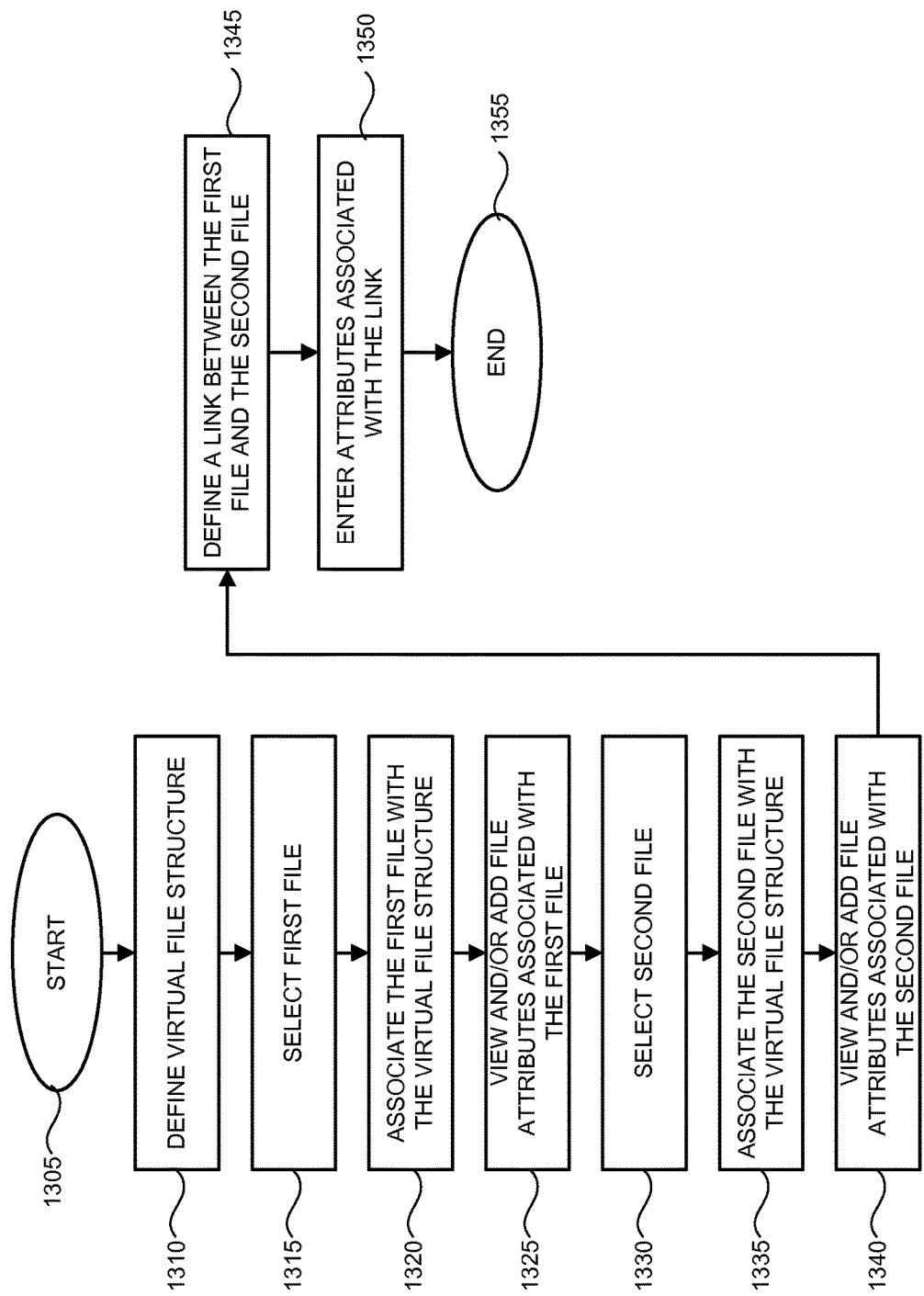
FIG. 13 is a flow diagram of a link building process from a user perspective, according to an embodiment of the invention.

FIG. 13 is a flow diagram of a link building process from a user perspective, according to an embodiment of the invention. As illustrated in FIG. 13, a link-building process begins in step 1305 and advances to step 1310 to define a virtual file structure. The virtual file structure may be, for instance, a room/cabinet/folder hierarchy as illustrated in the virtual folder area 455 of FIG. 4.

A user can then select a first file in step 1315 and associate the first file with the virtual file structure in step 1320. Selection step 1315 could include, for example, right clicking the first file in the system file area 445. Association step 1320 could include, for instance, dragging and dropping, or copying and pasting, the selected first file into the virtual file area 460. In step 1325, the user can view, edit and/or add attributes associated with the first file. The attributes may be, for instance, a description, labels, tags, and/or references (links) to one or more other files.

Similarly, a user can then select a second file in step 1330 and associate the second file with the virtual file structure in step 1335. Selection step 1330 could include, for example, right clicking the first file in the system file area 445. Association step 1335 could include, for instance, dragging and dropping, or copying and pasting, the selected second file into the virtual file area 460. In step 1340, the user can view, edit and/or add attributes associated with the first file. The attributes may be, for instance, a description, labels, tags, and/or references (links) to one or more other files.

In embodiments of the invention, the selection steps 1315 and/or 1330 could include searching for a file either in the native operating system (OS) file manager (e.g., MS Windows Explorer) or in a virtual file system. Association steps 1320 and/or 1335 may not be necessary for files already associated with at least one virtual file system (e.g., a file selected by a user in the virtual file area 460). In embodiments of the invention, steps 1325 and/or 1340 could be executed using attribute window 430 and/or the dialog window described below with reference to FIG. 15.

Subsequent to step 1340, a user may define a link between the first file and the second file in step 1345, and then enter attributes associated with the link in step 1350 before terminating the process in step 1355. Link defining step 1345 may include dragging and dropping the first and second files into the visualization window 425. In one embodiment, link defining step 1345 includes dragging and dropping the first file into the visualization window 425, and then dragging and dropping the second file into the visualization window 425 on top of the first file. In embodiments of the invention, step 1350 could be executed using attribute window 430 and/or the dialog window described below with reference to FIG. 15.

Figure 14:
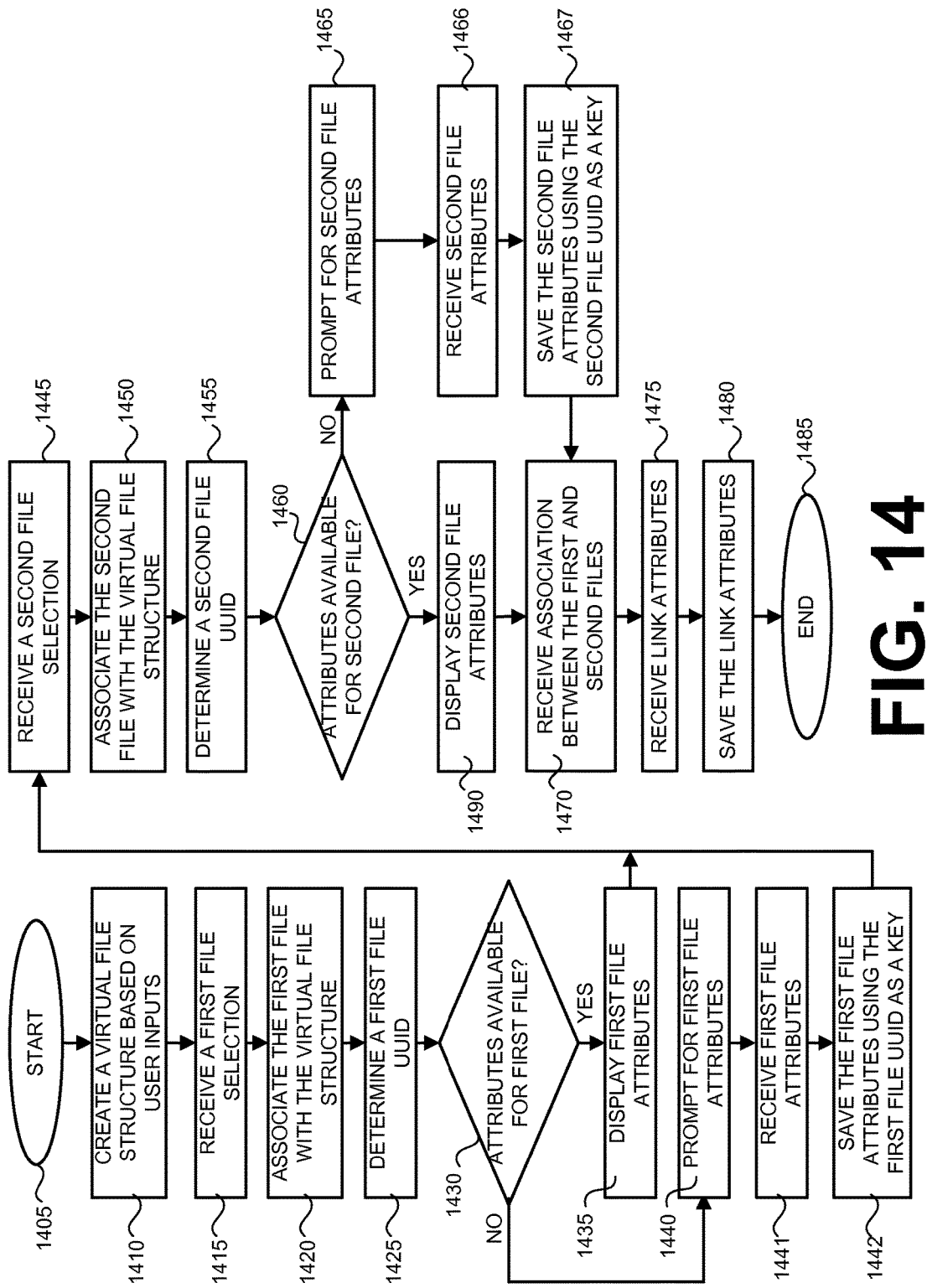
FIG. 14 is a flow diagram of a link building process from a system perspective, according to an embodiment of the invention.

FIG. 14 is a flow diagram of a link building process from a system perspective, according to an embodiment of the invention. As illustrated in FIG. 10, the link display/building process begins in step 1405. The process creates a virtual file structure based on user inputs in step 1410. The virtual file structure may be, for instance, a room/cabinet/folder hierarchy as illustrated in the virtual folder area 455 of FIG. 4. Next, the process receives a first file selection from a user in step 1415 and associates the first file with the virtual file structure based on user commands in step 1420. If the first selected file is a virtual file, then step 1420 is not necessary. The process determines a first file UUID in step 1425, for instance by reading the first file UUID from a predetermined header location of the first file. Step 1425 may also include generating the first file UUID and writing the first file UUID to a header of the first file as described below with reference to FIGS. 16 and 17.

In conditional step 1430, the process determines whether one or more attributes are associated with the first file. Step 1430 can be performed, for instance, by reading the data store 120 using the first file UUID as a database key. Where the result of conditional step 1430 is satisfied, the process may display the one or more first file attributes in step 1435 before advancing to step 1445 to receive a second file selection.

Where the result of conditional step 1430 is not satisfied, the process may prompt a user to input first file attributes in step 1440. The process may then receive the first file attributes in step 1441 and save the first file attributes using the first file UUID as a data store key in step 1442 before advancing to step 1445.

The process receives a second file selection from the user in step 1445 and associates the second file with the virtual file structure in step 1450 based on user commands. If the second selected file is a virtual file, then step 1450 is not necessary. The process determines a second file UUID in step 1455, for instance by reading the second file UUID from a predetermined header location of the second file. Step 1445 may also include generating the second file UUID and writing the second file UUID to a header of the second file as described below with reference to FIGS. 16 and 17.

In conditional step 1460, the process determines whether one or more attributes are associated with the second file. Step 1460 can be performed, for instance, by reading the data store 120 using the second file UUID as a database key. Where the result of conditional step 1460 is satisfied, the process may display the one or more second file attributes in step 1490.

Where the result of conditional step 1460 is not satisfied, the process may prompt a user to input second file attributes in step 1465. The process may then receive the second file attributes in step 1466 and save the second file attributes using the second file UUID as a data store key in step 1467.

Subsequent to steps 1467 or 1490, the process may receive an association (or link) between the first and second files in step 1470. Step 1470 may be enabled by the visualization window 425 GUI. The process receives link attributes in step 1475 and saves the link attribute data to a data store in step 1480 before terminating in step 1485. The definition of a link also creates file attributes; accordingly, step 1480 may include storing reference attributes for both the first file and the second file (the first file becomes a reference attribute of the second file, and the second file becomes a reference attribute of the first file).

Variations to the process illustrated in FIG. 14 are possible. For example, steps 1410, 1420, and 1450 may not be required where a virtual file structure has already been defined, and where the first file and the second file are virtual files with the predefined virtual file structure. Moreover, the process may not prompt a user to input file attributes in steps 1440 and/or 1465. Display steps 1435 and/or 1490 could also allow a user to edit the displayed file attribute data. Where the process does prompt the user for file or link attribute data, steps 1440, 1465 and/or 1475 could include displaying a dialog window similar to the one described below with reference to FIG. 15.

Figure 15:
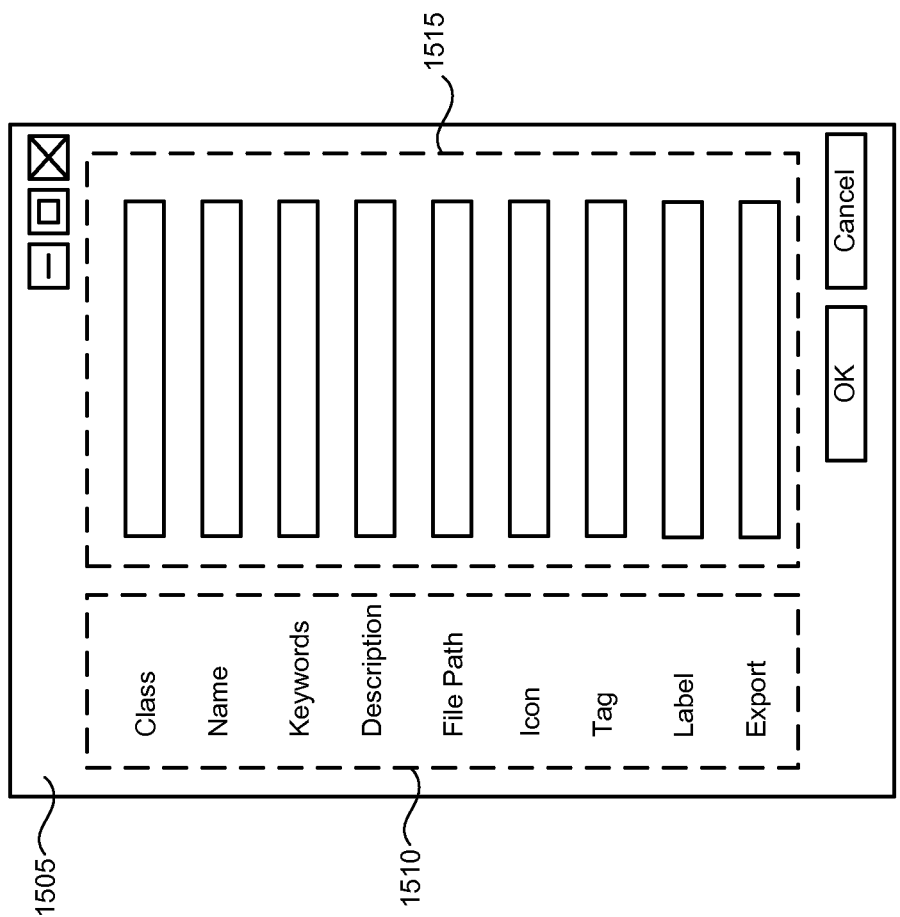
FIG. 15 is an illustration of an attribute dialog window, according to an embodiment of the invention.

FIG. 15 is an illustration of an attribute dialog window, according to an embodiment of the invention. As shown therein, a dialog window 1505 may include a listing of multiple attribute types 1510 and a corresponding listing of multiple attribute values 1515. In embodiments of the invention, one or more of the multiple attribute values 1515 may be automatically assigned. The multiple attribute types 1510 could vary between files and links.

Figure 16:
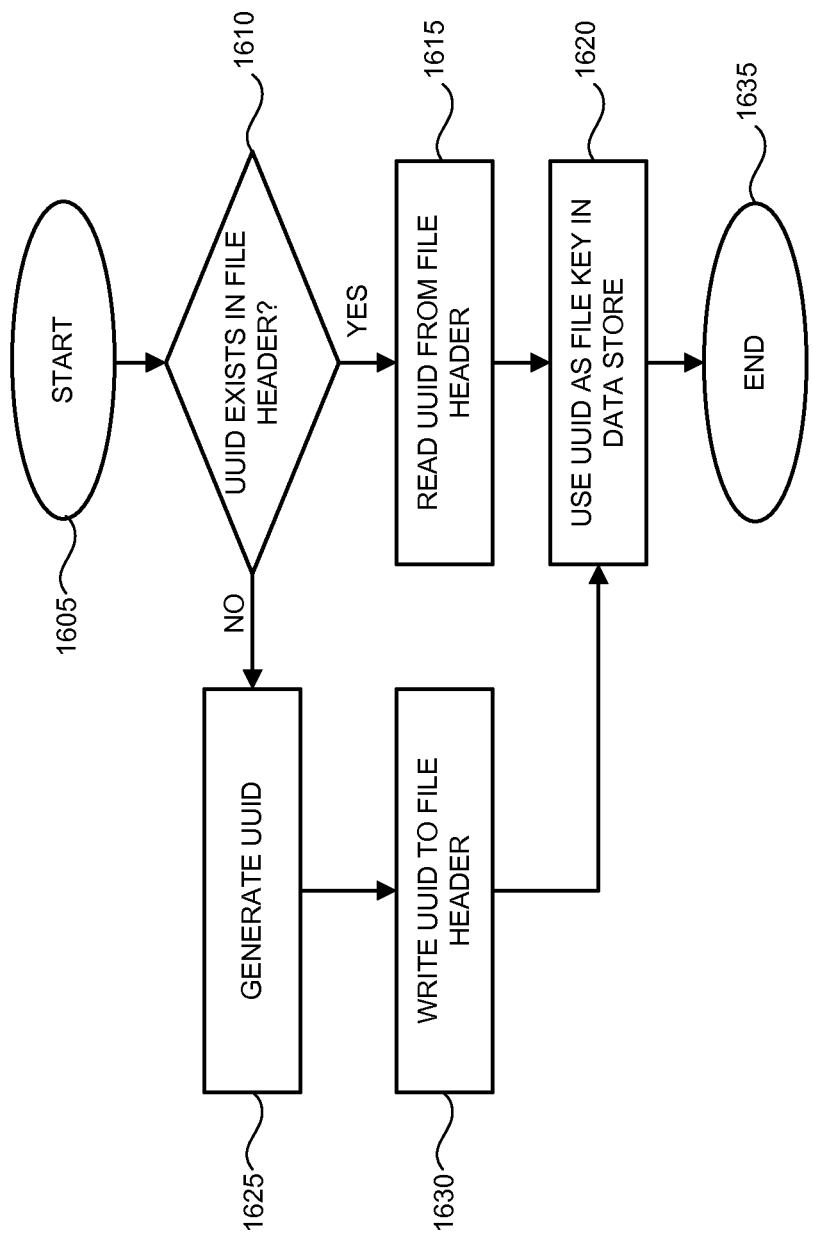
FIG. 16 is a flow diagram of a process for determining a file key from a system perspective, according to an embodiment of the invention.

FIG. 16 is a flow diagram of a process for determining a file key, according to an embodiment of the invention. The process in FIG. 16 may be executed by the file key determining module 205, and is one way to implement determining steps 1425 and 1455. As illustrated in FIG. 16, the process for determining a file key begins in step 1605, and then advances to conditional step 1610. In conditional step 1610, the process determines whether a Universally Unique Identifier (UUID) exists in a file header. Where the result of conditional step 1610 is not satisfied, the process generates a UUID in step 1625. Step 1625 may generate a UUID, for example, in accordance with the time-based version described in Request for Comment (RFC) memorandum 4122. The process then writes the generated UUID to the file header in step 1630 before using the UUID as a file key in a data store (for instance to store file attribute data) in step 1620 and terminating in step 1635. Where the result of conditional step 1610 is satisfied, the process reads the existing UUID from the file header in step 1615 before advancing to step 1620. The above-described process thus assigns or reads a UUID in a file header rather than identifying a file by file name.

Variations for the process illustrated in FIG. 16 and described above are possible. For instance, reading step 1615 could be a part of conditional step 1610. In this case, the process could advance to step 1620 if the read is successful, and go to step 1625 if the read operation fails. In addition, UUID generation step 1625 could instead produce a UUID having a name-based, random, or pseudo-random format as described in RFC 4122. RFC 4122 is hereby incorporated into this specification by reference for all that it discloses about UUID formats. Other UUID formats could also be used, according to design choice.

Figure 17:
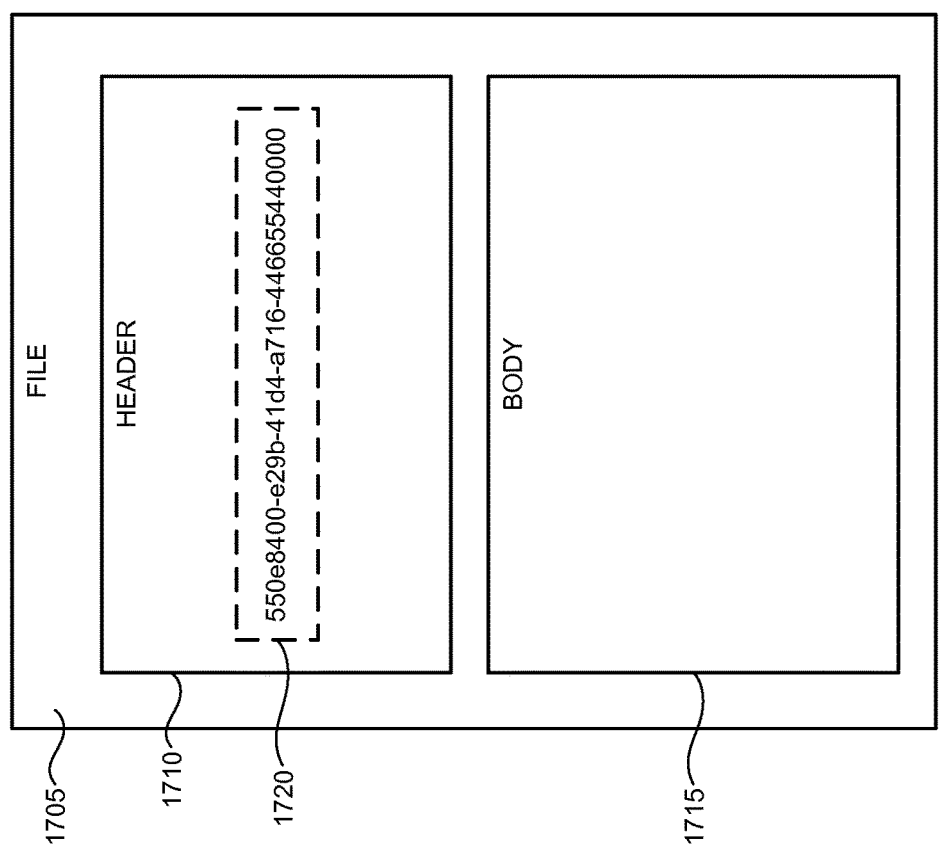
FIG. 17 is an illustration of a file structure, according to an embodiment of the invention.

FIG. 17 is an illustration of a file structure, according to an embodiment of the invention. FIG. 17 illustrates that a file 1705 may include a header 1710 and a body 1715. The header 1710 may include a UUID string 1720.

Figure 18:
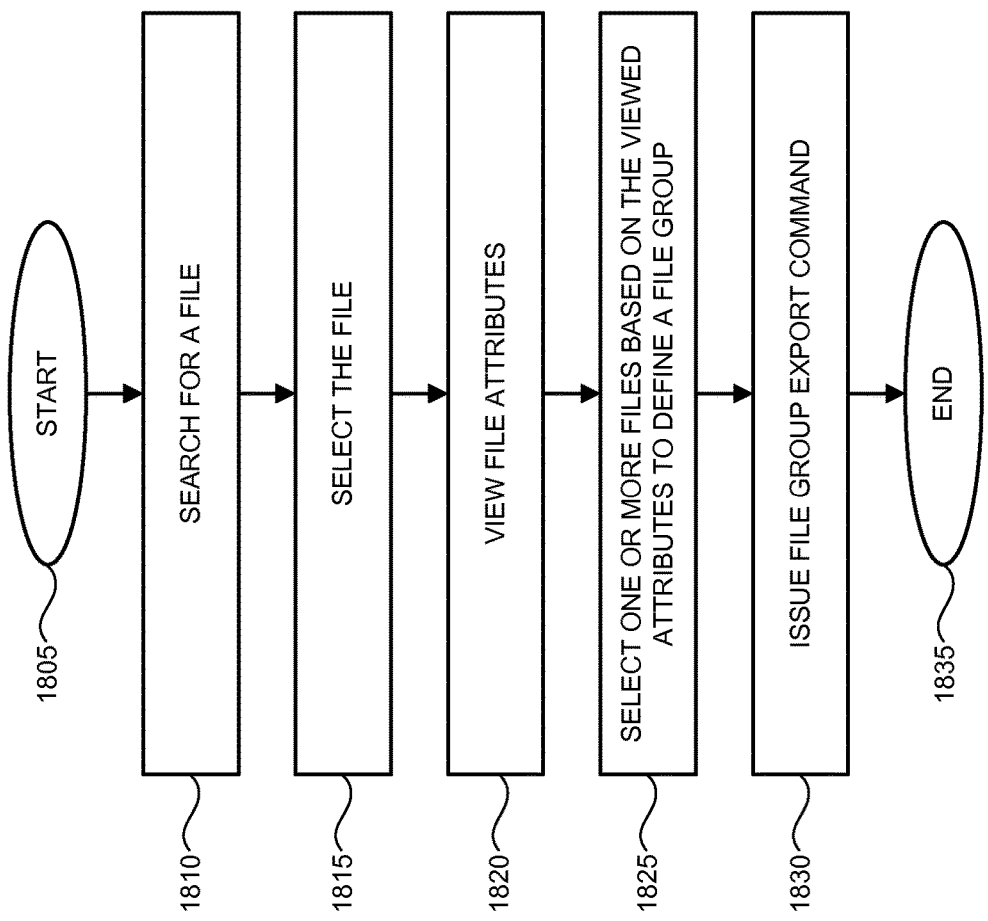
FIG. 18 is a flow diagram of an export process from a user perspective, according to an embodiment of the invention.

FIG. 18 is a flow diagram of an export process from a user perspective, according to an embodiment of the invention. As illustrated in FIG. 18, an export process may begin in step 1805, and then a user may search for a file in step 1810. The search process in step 1810 may be based on one or more predetermined file attributes. A user may select a file in step 1815 and then view file attributes associated with the selected file in step 1820. Next, in step 1825, a user may select one or more files and/or associated attributes for export based on the viewed attributes to define a file group. Then a user may issue a file group export command in step 1830 before terminating the process in step 1835. The file group export command could direct the export of files, file attributes, or some combination of files and file attributes, according to the user's instructions.

Variations to the process illustrated in FIG. 18 and described above are possible. For instance, in an alternative embodiment, the search step 1810 could be used to identify a group of files. In this case, steps 1815 and/or 1820 may be omitted. In embodiments of the invention, the search step 1810 and/or the export selection step 1825 may also include link attributes in combination with file attributes. For instance, a user might wish to export all files labeled "2010 taxes" with all related link attributes except for "link authors."

Figure 19:
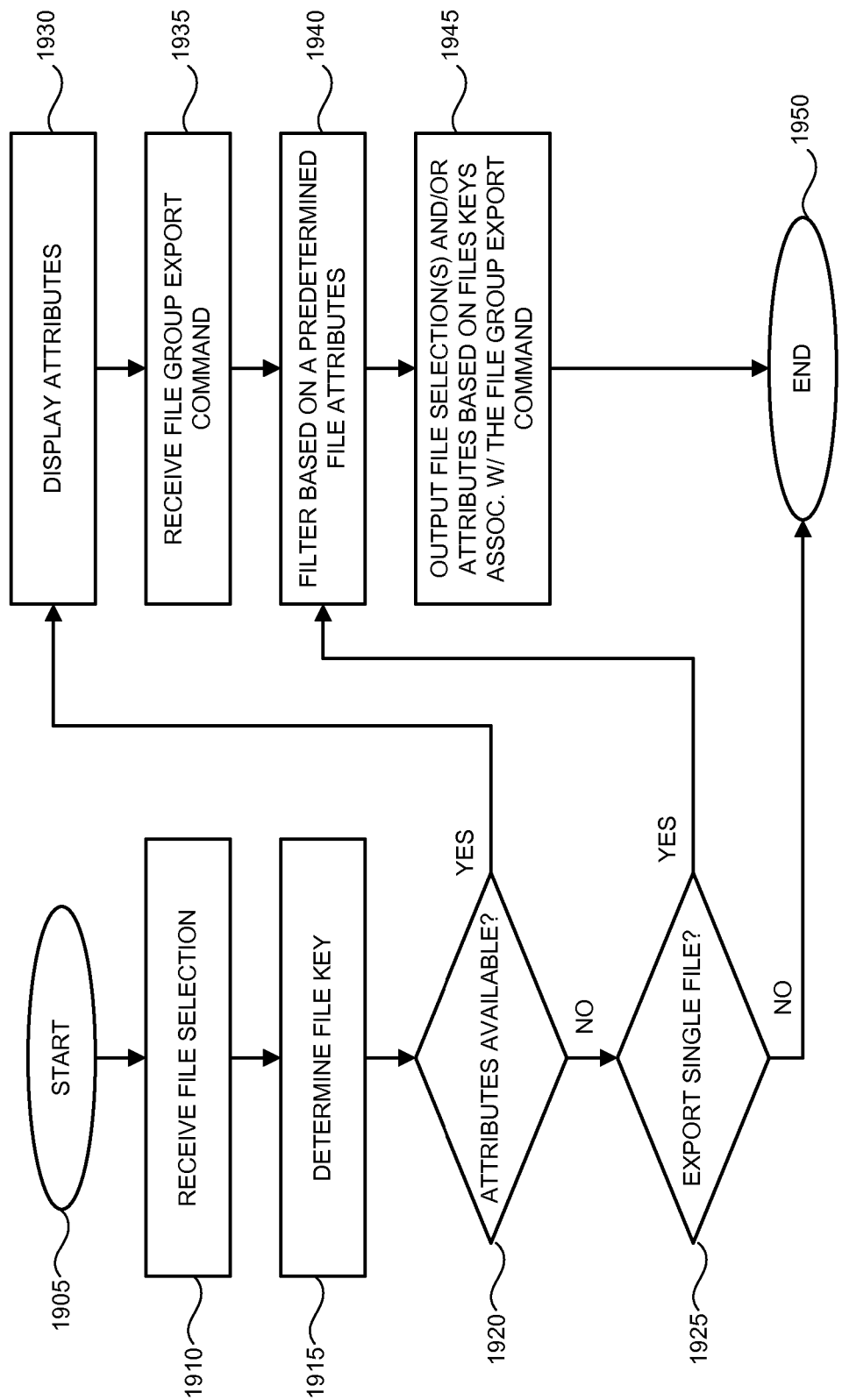
FIG. 19 is a flow diagram of an export process from a system perspective, according to an embodiment of the invention.

FIG. 19 is a flow diagram of an export process, according to an embodiment of the invention. The process in FIG. 19 is presented from the perspective of a system. As illustrated in FIG. 19, an export process may begin in step 1905, and then receive a file selection in step 1910. Next, the process may determine a file key in step 1915. Step 1915 may be performed, for instance, using the process described above with reference to FIG. 16. Next, in conditional step 1920, the process determines whether attributes are associated with the selected file. Step 1920 may by performed by searching the data store 120 with the key. Where the condition in step 1920 is not satisfied, the process advances to conditional step 1925 to determine whether to export a single file. Where the result of conditional step 1925 is not satisfied, the process terminates in step 1950. Where the result of conditional step 1920 is satisfied, the process advances to step 1930 to display file attributes. Then, the process receives a file group export command in step 1935 and filters the file group based on predetermined file export attributes in step 1940. The process outputs one or more filtered files and/or attribute data in step 1945 before terminating in step 1950. Where the result of conditional step 1925 is satisfied, the process also advances to step 1940.

Figure 20:
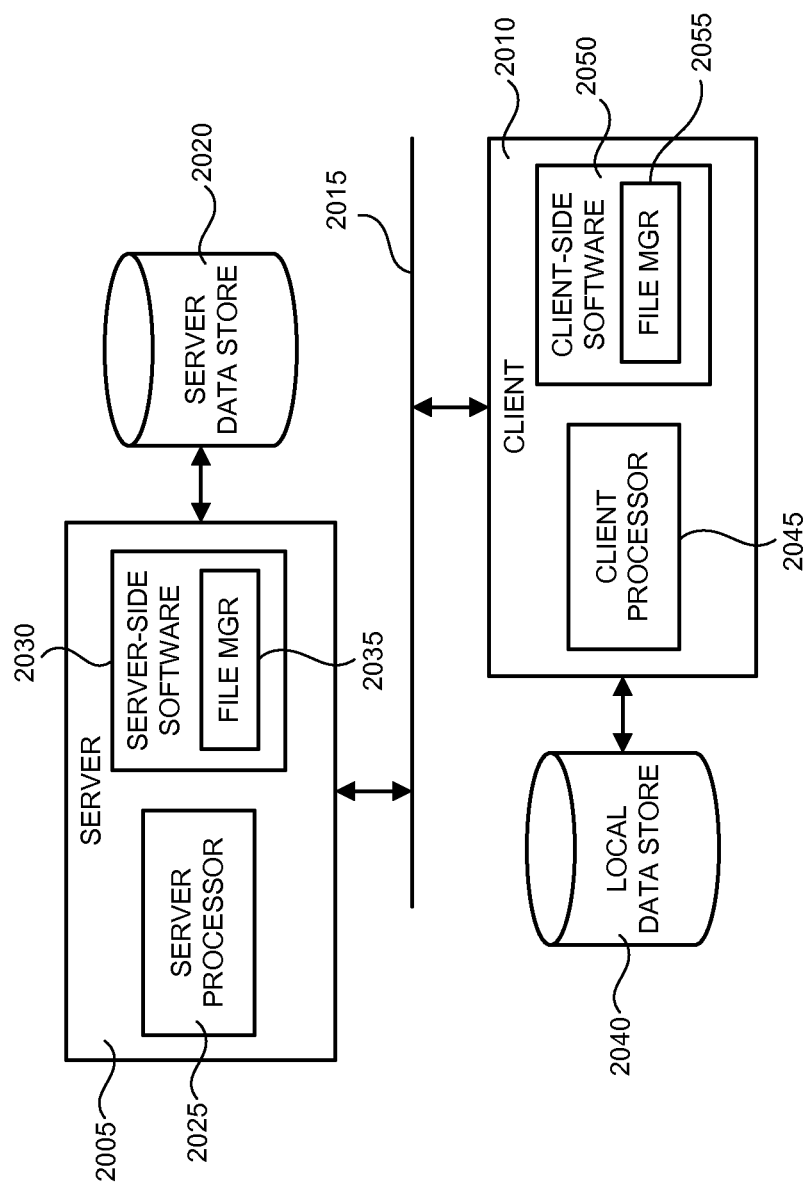
FIG. 20 is a functional block diagram of an enterprise system, according to an embodiment of the invention.

FIG. 20 is a functional block diagram of an enterprise system, according to an embodiment of the invention. As illustrated in FIG. 20, a system may include a server 2005 coupled to a client 2010 via a network 2015. The server 2005 may include a server processor 2025 and server-side software 2030. The server-side software 2030 may further include a file manager 2035. The server 2005 may further be coupled to a server data store 2020. The client 2010 may include a client processor 2045 and client-side software 2050. The client-side software 2050 may include a file manager 2055. The client 2010 may be further coupled to a local data store 2040.

The enterprise illustrated in FIG. 20 and described above may include one or more functional components illustrated in FIG. 1 and FIG. 2. For instance, in one embodiment, the server-side software 2030, file manager 2035 and server data store 2020 may be configured to implement the functions of the file management system (FMS) 105, integration components 110 and/or user interface 115. In an alternative embodiment, the client-side software 2050, file manager 2055 and local data store 2040 may be configured to implement the functions of the FMS 105, integration components 110 and/or user interface 115. In yet another embodiment, the server 2005, server data store 2020, client 2010, and local data store 2040 may cooperate to execute the function of the FMS 105, integration components 110 and/or user interface 115.

Lineage data is a particular type of file attribute data. As used herein, lineage data (or a lineage record) relates to file ancestry. Such information can be useful, for example, for file management tasks and/or forensic purposes.

Figure 21:
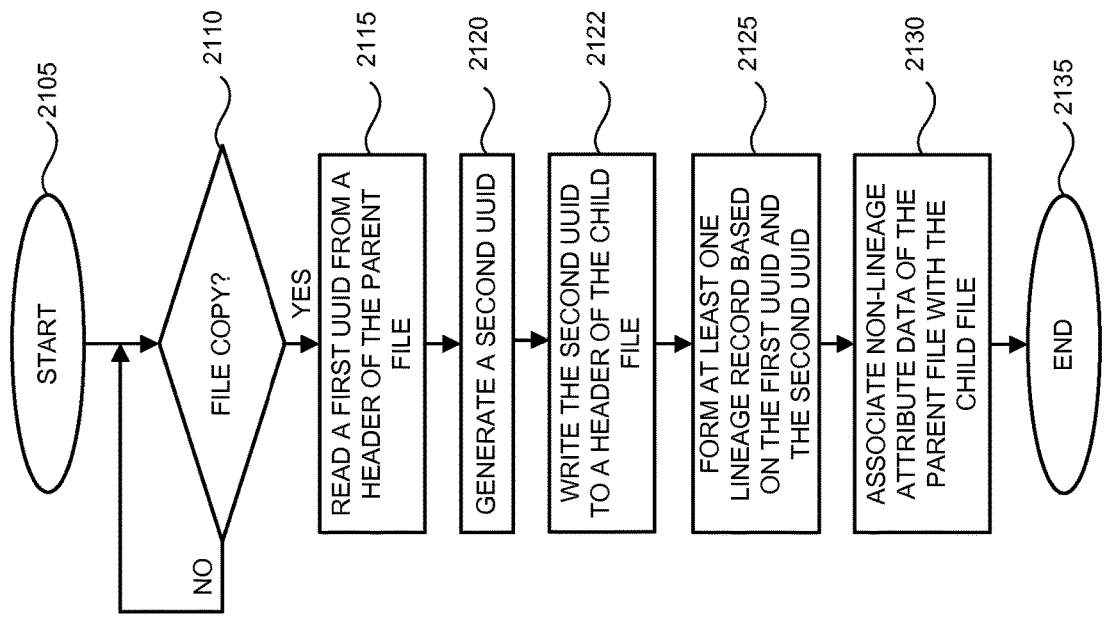
FIG. 21 is a flow diagram of a file copy process from a system perspective, according to an embodiment of the invention.

FIG. 21 is a flow diagram of a file copy process from a system perspective, according to an embodiment of the invention. As illustrated in FIG. 21, the process begins in step 2105 and then determines in conditional step 2110 whether a file is being copied. A file copy may be initiated by a user, for instance, when the user is creating a new document from a template or when the user is preparing to export a copy of a file. As used herein, the original file is the parent file (or parent) and the copy is a child file (or child).

If the condition of step 2110 is satisfied, the process reads a first UUID data from a header of the parent file in step 2115. The first UUID data may be, for instance, the UUID string 1720 described with reference to FIG. 17 above. Next, the process generates a second UUID in step 2120 and writes the second UUID to a header of the child file in step 2122. Step 2120 may be or include, for instance, generating a UUID in a time-based, name-based, random, or pseudo-random UUID format in accordance with RFC memorandum 4122 and as described above with reference to step 1625 in FIG. 16.

In step 2125, the process creates a lineage record based on the first UUID and the second UUID. A first embodiment of step 2125 that creates a lineage record in a file header is described below with reference to FIGS. 22-27. A second embodiment of step 2125 that creates a lineage record in the data store 120 is described with reference to FIG. 28. In either embodiment of step 2125, the lineage record may be encrypted for security. The two embodiments of step 2125 may be used in the alternative or in combination.

Next, the process associates non-lineage attribute data of the parent file with the child file in step 2130. The non-lineage attribute data may be or include, for instance, a description, label, tag, and/or reference (logical link) to one or more other files as generally described above, for instance with reference to FIGS. 5-10. In a first embodiment of step 2130, the non-lineage attribute data of the parent is written to the header of the child as described with reference to FIG. 25 below. In a second embodiment of step 2130, the non-lineage attribute data of the child is written to the header of the parent file. In a third embodiment of step 2130, the process reads the non-lineage attribute data of the parent from the data store 120 (using the parent UUID as the data store key) and then writes the non-lineage file attribute data to the data store 120 (using the child UUID as the data store key).

Either embodiment of step 2130 may be performed by the system without user intervention. Alternatively, the system may execute step 2130 with user interaction. For instance the system may present a list of parent file attributes to a user and then receive selections from the user indicating which parent file attributes the user wishes to associate with the child.

The two embodiments of step 2130 may be used in the alternative or in combination. The illustrated process terminates in step 2135.

FIG. 21 thus illustrates that, upon a file copy, an embodiment of the file management system disclosed herein may create a lineage record based on the parent UUID and the child UUID. In addition, upon a file copy, the file management system may associate non-lineage attribute data of the parent with the child. In an embodiment of the invention that stores lineage data and/or non-lineage attribute data in file headers, the data store 120 may not be required.

Variations to the process illustrated in FIG. 21 are possible. For instance, the illustrated steps may be re-sequenced. For example step 2120 could precede step 2115. Likewise, step 2130 could precede step 2125. Moreover, in an alternative embodiment, process step 2130 may be omitted.

Figure 22:
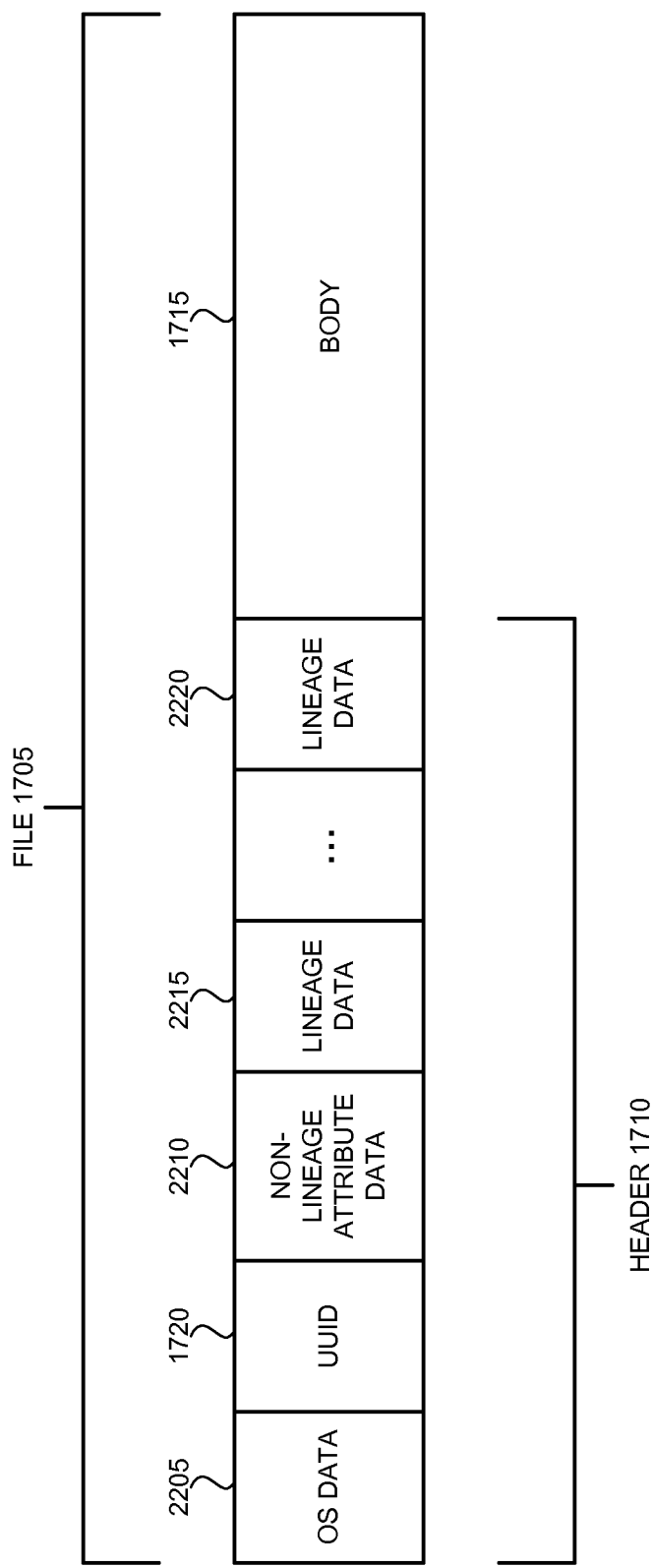
FIG. 22 is an illustration of a file structure, according to an embodiment of the invention.

FIG. 22 is an illustration of a file structure, according to an embodiment of the invention. As illustrated, the header 1710 of the file 1705 may include an OS data 2205, UUID 1720, non-lineage attribute data 2210, and/or lineage data 2215 through 2220. As used herein, OS data, including OS data 2205, may include revision history and/or other metadata provided, for instance, by authoring or management software. Variations to the file structure illustrated in FIG. 22 are possible. For instance, the file header 1710 may have zero, one, or more than one non-lineage attribute data items 2210. Likewise, the file header 1710 may have zero, one, or more than one lineage data items 2215, 2220.

FIGS. 23-27 further illustrate features of the general file structure disclosed in FIG. 22.

Figure 23:
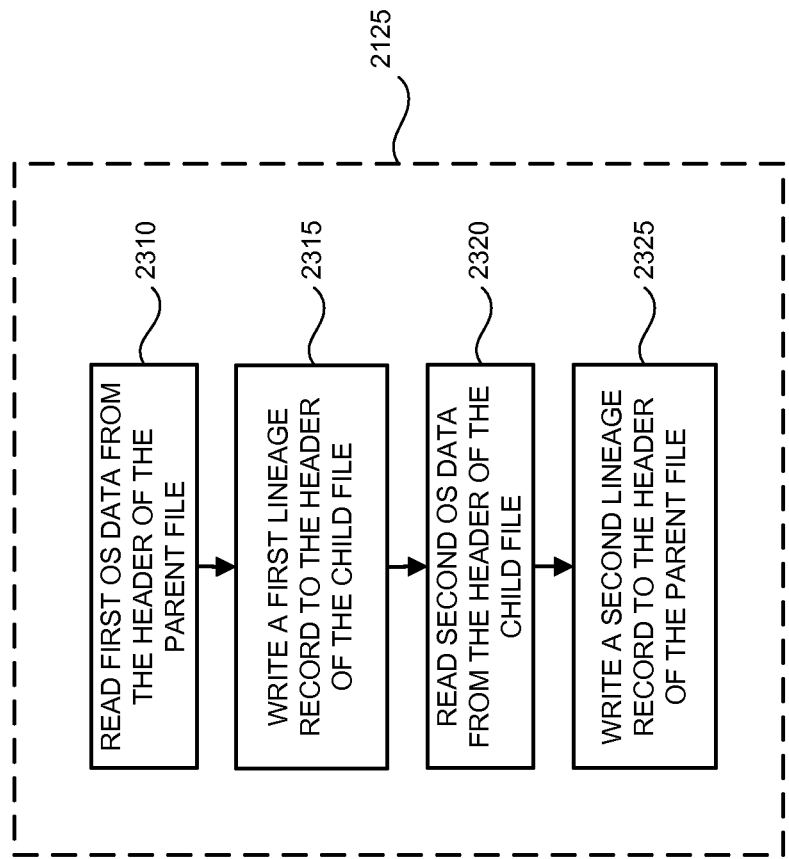
FIG. 23 is a flow diagram of process for creating a lineage record, according to an embodiment of the invention.

FIG. 23 is a flow diagram of process for creating a lineage record, according to an embodiment of the invention. The process in FIG. 23 is a first alternative embodiment of process step 2125. As shown therein, the process reads first OS data from the header of the parent file in step 2310, writes a first lineage record to the header of the child file in step 2315, reads second OS data from the header of the child file in step 2320, and writes a second lineage record to the header of the parent file in step 2325. In the illustrated embodiment, the first lineage record is based on the first UUID and the first OS data. Likewise, in the illustrated embodiment, the second lineage record is based on the second UUID and the second OS data.

Variations to the process flow illustrated in FIG. 23 and described above are possible. For instance the process could be amended to only annotate the child file and not the parent file; in this case, steps 2320 and 2325 would not be required. Likewise, the process could be changed to only annotate the parent file and not the child file; in this case, steps 2310 and 2315 would not be required. Moreover, OS data could be omitted from the first linage record and/or the second lineage record; thus, in an alternative embodiment, steps 2310 and/or 2320 could be omitted.

FIG. 24 is an illustration of a structure for a parent file and a child file, according to an embodiment of the invention. File pair 2400 includes a parent 2405 and child 2410. The file pair 2400 is illustrated after completion of process step 2125. The parent 2405 includes OS data 2415, UUID 2420, lineage data 2425 and body 2430. The child 2410 includes OS data 2435, UUID 2440, lineage data 2445 and body 2450. UUID 2440 could have been generated, for instance, in step 2120. Lineage data 2425 and 2445 could have been generated, for instance, in step 2125. Lineage data 2425 in the parent 2405 may include OS data 2435 and UUID 2440 associated with the child 2410. Lineage data 2445 in the child 2410 may include OS data 2415 and UUID 2420 associated with the parent 2405.

FIG. 25 is an illustration of a structure for a parent file and a child file, according to an embodiment of the invention. File pair 2500 includes a parent 2505 and child 2510. The file pair 2500 is illustrated after completion of process step 2130. The parent file 2505 includes OS data 2515, UUID 2520, non-lineage attribute data 2525, lineage data 2530 and body 2535. The child 2510 includes OS data 2540, UUID 2545, lineage data 2550, non-lineage attribute data 2555, and body 2560. UUID 2545 could have been generated, for instance, in step 2120. Lineage data 2530 and 2550 could have been generated, for instance, in step 2125. Non-lineage attribute data 2525 of the parent 2505 could have been copied to the child 2510 as non-lineage attribute data 2555 in accordance with the first embodiment of step 2130. FIG. 25 thus illustrates that an embodiment of the file management system may include lineage data and non-lineage attribute data in a header of a parent file. The file management system may write lineage data associated with the parent in the header of a child file; in addition, where non-lineage attribute data of the parent is appropriate for the child, the system may write such non-lineage attribute data to the header of the child file.

Because non-lineage data 2555 has been associated with the file 2510, the file management system could later associate such non-lineage data with a child of file 2510 (not shown). Accordingly, step 2130 may be applied to multiple file generations.

Figure 26:
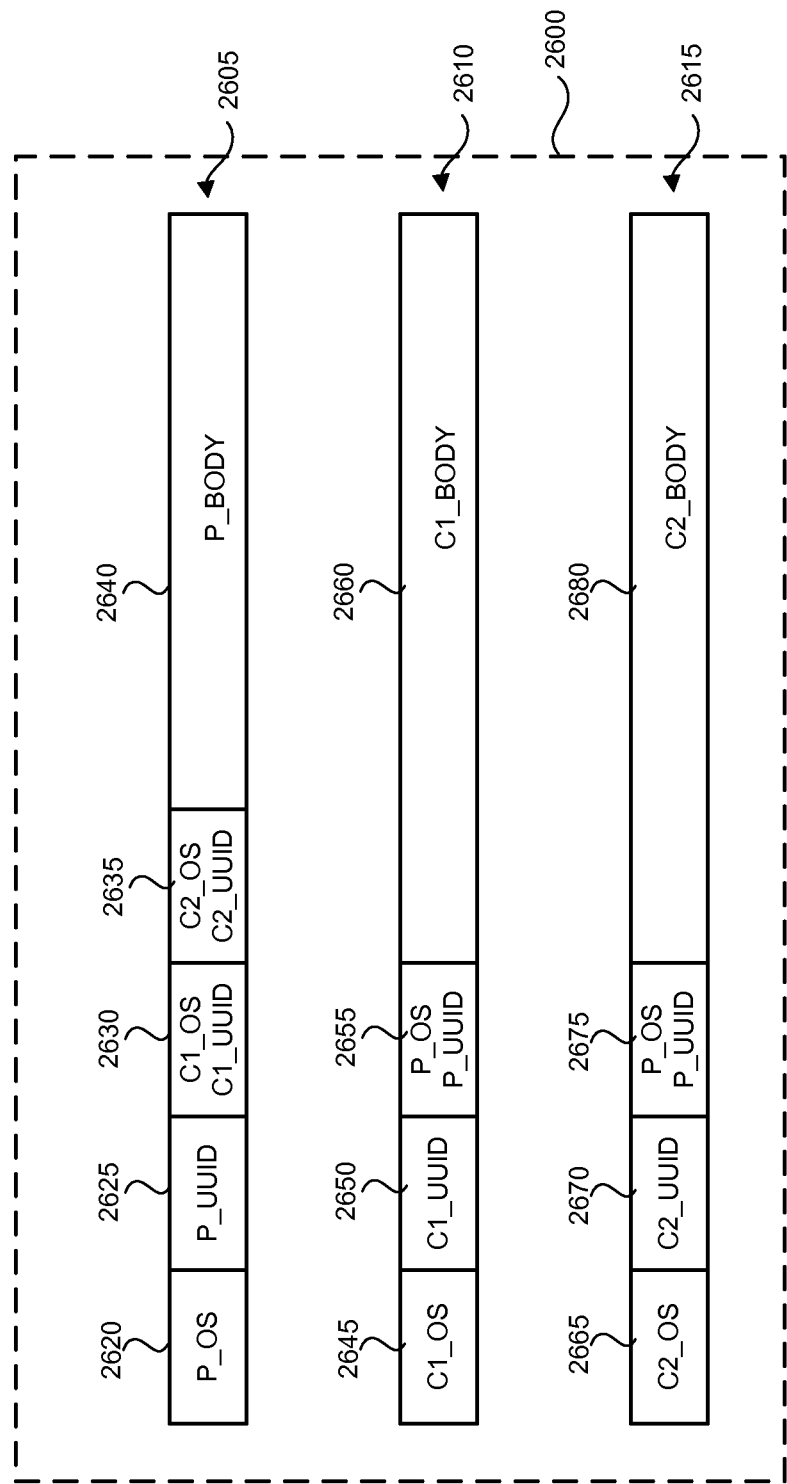
FIG. 26 is an illustration of a structure for three related files, according to an embodiment of the invention.

FIG. 26 is an illustration of a structure for three related files, according to an embodiment of the invention. Files 2600 include a single parent 2605 with two children 2610 and 2615. The files 2600 are illustrated after completion of process step 2125. The parent file 2605 includes OS data 2620, UUID 2625, lineage data 2630, lineage data 2635, and body 2640. The lineage data 2630 is associated with the child 2610; the lineage data 2635 is associated with the child 2615. The child 2610 includes OS data 2645, UUID 2650, lineage data 2655 and body 2660. The lineage data 2655 is associated with the parent 2605. The child 2615 includes OS data 2665, UUID 2670, lineage data 2675 and body 2680. The lineage data 2675 is associated with the parent 2605. FIG. 26 thus illustrates that the file management system disclosed herein may populate the header of a parent file with lineage data associated with multiple children.

Figure 27:
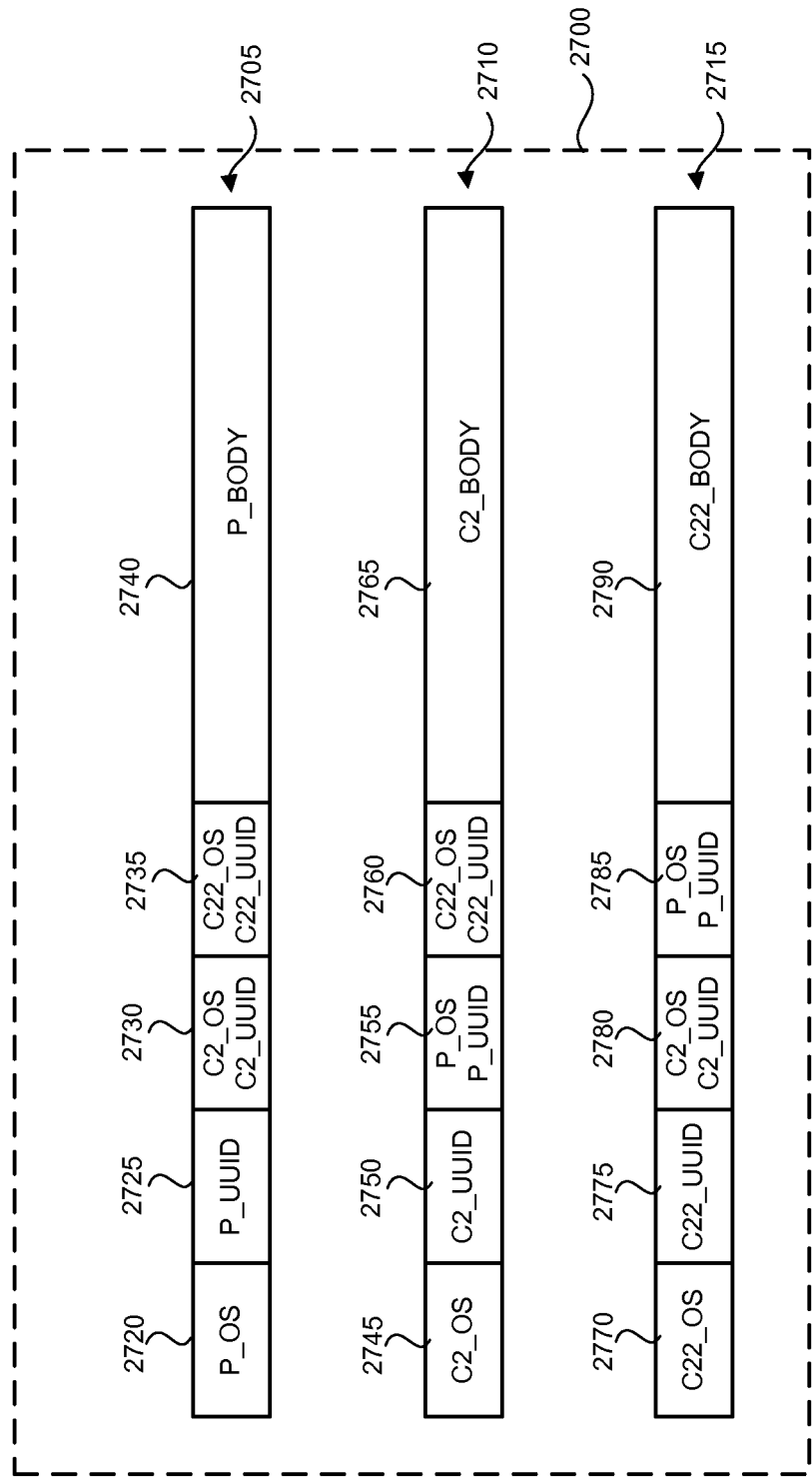
FIG. 27 is an illustration of a structure for three related files, according to an embodiment of the invention.

FIG. 27 is an illustration of a structure for three related files, according to an embodiment of the invention. Files 2700 include file 2705, file 2710, and file 2715. The files 2700 are illustrated after completion of process step 2125. File 2705 includes OS data 2720, UUID 2725, lineage data 2730, lineage data 2735, and body 2740. The lineage data 2730 is associated with file 2710, a child with respect to the file 2705. The lineage data 2735 is associated file 2715, a grandchild with respect to the file 2705. The file 2710 includes OS data 2745, UUID 2750, lineage data 2755, lineage data 2760, and body 2765. The lineage data 2755 is associated with file 2705, a parent with respect to the file 2710. The lineage data 2760 is associated with file 2715, a child with respect to the file 2710. The file 2715 includes OS data 2770, UUID 2775, lineage data 2780, lineage data 2785, and body 2790. The lineage data 2780 is associated with file 2710, a parent with respect to the file 2715. The lineage data 2785 is associated with file 2705, a grandparent with respect to the file 2715. FIG. 27 thus illustrates that the lineage recordation step 2125 may be extended to multiple file generations.

FIG. 28 is a flow diagram of process for creating a lineage record, according to an embodiment of the invention. The process in FIG. 28 is a second alternative embodiment of process step 2125. As shown therein, step 2805 includes writing the second UUID to the data store as a child file attribute associated with the first UUID (i.e., using the first UUID data as a key). Next, in step 2810, the process writes the first UUID to the data store as a parent file attribute associated with the second UUID (i.e., using the second UUID data as a key).

Variations to the process illustrated in FIG. 28 are possible. For example, alternative embodiments may include only step 2805 or only step 2810. In addition, the variant of process step 2125 illustrated in FIG. 28 could also be extended to multiple file generations.

Any of the functions described herein, for instance with reference to FIGS. 1-10, 14-16, 19, 20, 21, 23, and 28 may be implemented in hardware, software, or a combination of hardware and software, according to design choice.

Embodiments of the invention provide, among other things, an improved system and method for building logical associations (links) between files and for assigning attributes to the files and/or links. As described above, such attributes may include, for instance, keywords, descriptions, labels, tags, lineage data and/or other attributes. In one respect, such attributes improve the way that files can be searched, exported, or otherwise managed. Moreover, in embodiments of the invention, the attribute data is stored separately from the file and indexed according to UUID's in the header of each corresponding file. In embodiments of the invention, the attribute data may be stored in a file header separate from filename or other OS data. Thus, renaming, moving, and/or encrypting a file does not destroy the attribute data that has previously been associated with the file.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims. In addition, although references are made to embodiments of the invention, all embodiments disclosed herein need not be separate embodiments. In other words, many of the features disclosed herein can be utilized in combinations not expressly illustrated.

I claim:

1. A specially-configured computer comprising a processor and a file management system, the file management system configured to perform a file copying process, the file copying process including the steps of:

reading a first Universally Unique Identifier (UUID) in a header of a parent file, the parent file being an original file, the header of the parent file being a portion of the parent file;

generating a second UUID;

writing the second UUID to a header of a child file, the child file being a copy of the original file, the header of the child file being a portion of the child file; and forming a lineage record in at least one of the header of the child file and the header of the parent file, the lineage record associating the first UUID and the second UUID, the lineage record thus associating the parent file and the child file without reference to a filename of the parent file or a filename of the child file.

2. The specially-configured computer of claim 1, wherein forming the lineage record includes writing the first UUID to the header of the child file.

3. The specially-configured computer of claim 2, wherein forming the lineage record further includes:

reading Operating System (OS) data from the header of the parent file; and writing the OS data to the header of the child file.

4. The specially-configured computer of claim 1, wherein forming the lineage record includes writing the second UUID to the header of the parent file.

5. The specially-configured computer of claim 4, wherein forming the lineage record further includes:

reading Operating System (OS) data from the header of the child file; and writing the OS data to the header of the parent file.

6. The specially-configured computer of claim 1, the copying process further including the step of associating non-lineage attribute data of the parent file with the child file.

7. The specially-configured computer of claim 6, wherein associating non-lineage attribute data includes copying non-lineage attribute data from the header of the parent file to the header of the child file.

8. The specially-configured computer of claim 1, the copying process further including the step of associating non-lineage attribute data of the child file with the parent file.

9. The specially-configured computer of claim 8, wherein associating non-lineage attribute data includes copying non-lineage attribute data from the header of the child file to the header of the parent file.

10. The specially-configured computer of claim 6, wherein the non-lineage attribute data includes a label relating to a subject matter classification.

11. The specially-configured computer of claim 6, wherein the non-lineage attribute data includes a tag relating to one of a planned action and a use restriction.

12. The specially-configured computer of claim 6, wherein the non-lineage attribute data includes reference to a linked file, the linked file not being associated with lineage.

13. The specially-configured computer of claim 8, wherein the non-lineage attribute data includes a label relating to a subject matter classification.

14. The specially-configured computer of claim 8, wherein the non-lineage attribute data includes a tag relating to one of a planned action and a use restriction.

15. The specially-configured computer of claim 8, wherein the non-lineage attribute data includes reference to a linked file, the linked file not being associated with lineage.

\* \* \* \* \*